(12) United States Patent
Horiuchi

(10) Patent No.: US 7,187,504 B2
(45) Date of Patent: Mar. 6, 2007

(54) ZOOM LENS AND IMAGE PICK UP APPARATUS INCLUDING THE SAME

(75) Inventor: Akihisa Horiuchi, Nerima-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/444,830

(22) Filed: May 31, 2006

(65) Prior Publication Data

US 2006/0279850 A1    Dec. 14, 2006

(30) Foreign Application Priority Data

Jun. 2, 2005    (JP)    ............................. 2005-162693

(51) Int. Cl.
*G02B 15/14*    (2006.01)

(52) U.S. Cl. .................. 359/683; 359/557; 359/676; 359/684; 359/685; 359/686; 359/713; 359/714; 359/763; 359/766

(58) Field of Classification Search ................ 359/557, 359/676, 683–686, 713–714, 763, 766
See application file for complete search history.

(56) References Cited

U.S. PATENT DOCUMENTS

| 5,847,882 | A | 12/1998 | Nakayama | |
|---|---|---|---|---|
| 6,094,312 | A | 7/2000 | Nakayama | |
| 6,985,303 | B2 * | 1/2006 | Takatsuki | ................... 359/684 |

FOREIGN PATENT DOCUMENTS

| JP | 39-29046 | 12/1964 |
|---|---|---|
| JP | 6-148523 | 5/1994 |
| JP | 8-5913 A | 1/1996 |
| JP | 8-5913 A5 | 1/1996 |
| JP | 8-146295 | 6/1996 |

* cited by examiner

*Primary Examiner*—Evelyn A. Lester
(74) *Attorney, Agent, or Firm*—Morgan & Finnegan, L.L.P.

(57) ABSTRACT

A zoom lens includes, in order from an object side to an image side: a first lens unit having positive optical power; a second lens unit having negative optical power; a third lens unit having positive optical power and an aperture stop; a fourth lens unit having negative optical power; and a fifth lens unit having positive optical power, in which, during zooming from a wide-angle end to a telephoto end, the first lens unit stays, the second lens unit moves toward the image side, and the third lens unit moves together with the aperture stop.

26 Claims, 11 Drawing Sheets

ZOOM LENS AND IMAGE PICK UP APPARATUS INCLUDING THE SAME

BACKGROUND OF THE INVENTION

1. Field of the Invention

The present invention relates to a zoom lens and an image pick up apparatus including the zoom lens and is suitable for use in, for example, an electronic camera such as a video camera or a digital still camera, a film camera, and a broadcast camera.

2. Related Background Art

Up to now, an example of a zoom lens used for a photographic camera such as a film camera or a digital still camera or a video camera includes a zoom lens employing a so-called rear focus system, in which lens units located in the rear of (closer to an image side than) a first lens unit closest to an object side are moved for focusing.

The zoom lens of the rear focus system is disclosed in each of Japanese Patent Application Laid-Open Nos. H06-148523, H08-005913, H08-146295, and Japanese Patent Publication No. S39-029046.

The zoom lens disclosed in the patent documents includes a first lens unit having positive refractive power, a second lens unit having negative refractive power, a third lens unit having positive refractive power, a fourth lens unit having negative refractive power, and a fifth lens unit having positive refractive power, which are disposed in order from the object side to the image side. Zooming is performed using the five lens units. The zoom lens is a zoom lens having a high-zoom ratio.

Note that the "refractive power" described in the specification of this application indicates optical power of a lens element or a lens unit and corresponds to the reciprocal of a focal length thereof.

In the zoom lens disclosed in Japanese Patent Application Laid-Open No. H06-148523, the second lens unit, the third lens unit, and the fourth lens unit are moved for zooming. The zoom lens has a zoom ratio of approximately 10 times and an F-number of approximately 2.0. In the zoom lens, an aperture stop is moved independently of the moved respective lens units during zooming.

In the zoom lens disclosed in Japanese Patent Application Laid-Open Nos. H08-005913 and H08-146295 (corresponding to U.S. Pat. No. 5,847,882 and U.S. Pat. No. 6,094,312), an aperture stop is disposed between the second lens unit and the third lens unit. During zooming from a wide-angle end to a telephoto end, the second lens unit is moved toward the image side and the fourth lens unit for focusing is moved. However, the aperture stop is fixed in the zoom lens and thus it is not moved during zooming.

In the zoom lens disclosed in Japanese Patent Publication No. S39-029046, the second lens unit and the fourth lens unit are moved during zooming from the wide angle end to the telephoto end. The zoom lens has a zoom ratio of approximately 4.2.

In recent years, with a reduction in size of an image pick up apparatus and an increase in resolution of an image pick up element, a zoom lens whose zoom ratio is high and in which a size of the entire lens system is small has been required as a zoom lens used for a digital camera, a video camera, and the like.

SUMMARY OF THE INVENTION

An object of the present invention is to provide an improved zoom lens whose zoom ratio is high and in which a size of the entire lens system is small and an image pick up apparatus including the zoom lens.

According to one aspect of the invention, a zoom lens includes, in order from an object side to an image side: a first lens unit having positive optical power; a second lens unit having negative optical power; a third lens unit having positive optical power and an aperture stop; a fourth lens unit having negative optical power; and a fifth lens unit having positive optical power, during zooming from a wide-angle end to a telephoto end, the first lens unit does not move, the second lens unit moves toward the image side, and the third lens unit moves together with the aperture stop.

As in embodiments described later, it is possible to employ not only a mode in which the fourth lens unit moves during the zooming from the wide-angle end to the telephoto end and moves during focusing but also a mode in which the movement thereof is not performed.

In this application, embodiments of a best mode in which the third lens unit moves along a locus convex to the object side during the zooming from the wide-angle end to the telephoto end are described. However, a movement locus of the third lens unit in the present invention is not limited to such a locus.

Further, according to the present invention, in the zoom lens, at least one of the following three conditions is preferably satisfied. It is more preferable to satisfy all of the three conditions;

$$0.2 < |f2/fA| < 0.4,$$

$$2.10 < e4T/fw < 4.35,$$

$$0.7 < |f3/fA| < 1.3,$$

where $$fA = \sqrt{fw \cdot ft}$$

fw and ft represent a focal length of an entire system at the wide-angle end and a focal length thereof at the telephoto end, respectively, f2, f3, and f4 represent a focal length of the second lens unit, a focal length of the third lens unit, and a focal length of the fourth lens unit, respectively, and e4T represents a principal point interval between the fourth lens unit and the fifth lens unit in a case where focusing is performed on an infinitely distant object at the telephoto end. The embodiments described later disclose cases of satisfying all of the three conditions as the best mode. Further, in the zoom lens of the best mode, the following condition is also satisfied, $1.5 < M2/M3 < 5.4$, where M2 represents a movement amount of the second lens unit in a case where zooming is performed from the wide-angle end to the telephoto end and M3 represents a distance on an optical axis between a position of the third lens unit in a case where the third lens unit is located at the most object side and a position thereof in the case where the third lens unit is located at the most image side.

DETAILED DESCRIPTION OF THE PREFERRED EMBODIMENTS

Hereinafter, a zoom lens according to each of embodiments of the present invention and an image pick up apparatus including the zoom lens will be described.

Figure 1:
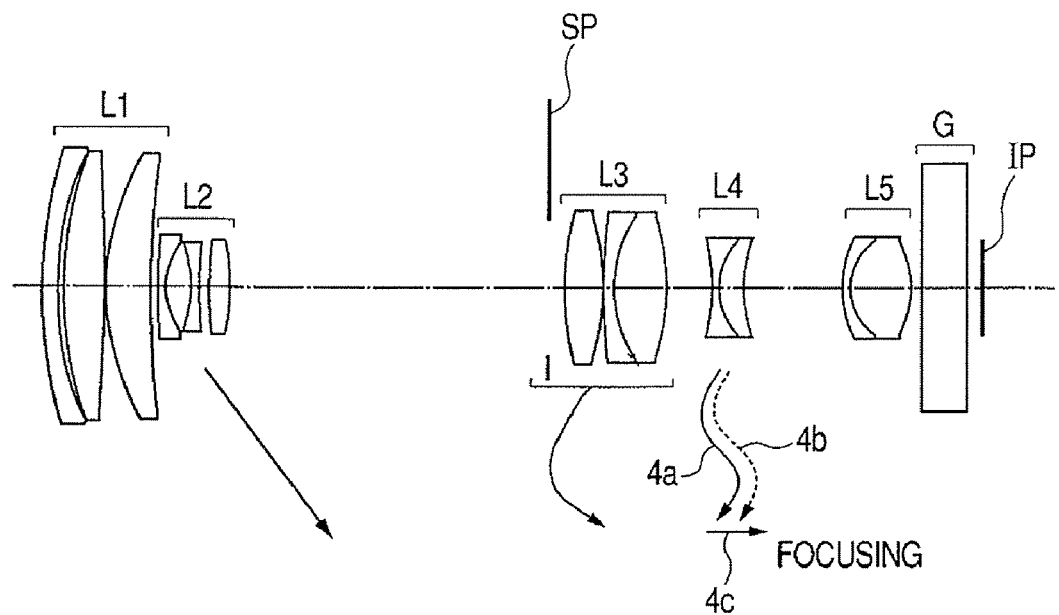
FIG. 1 is a lens sectional view showing a zoom lens at a wide-angle end according to Embodiment 1 of the present invention.
Figure 2:
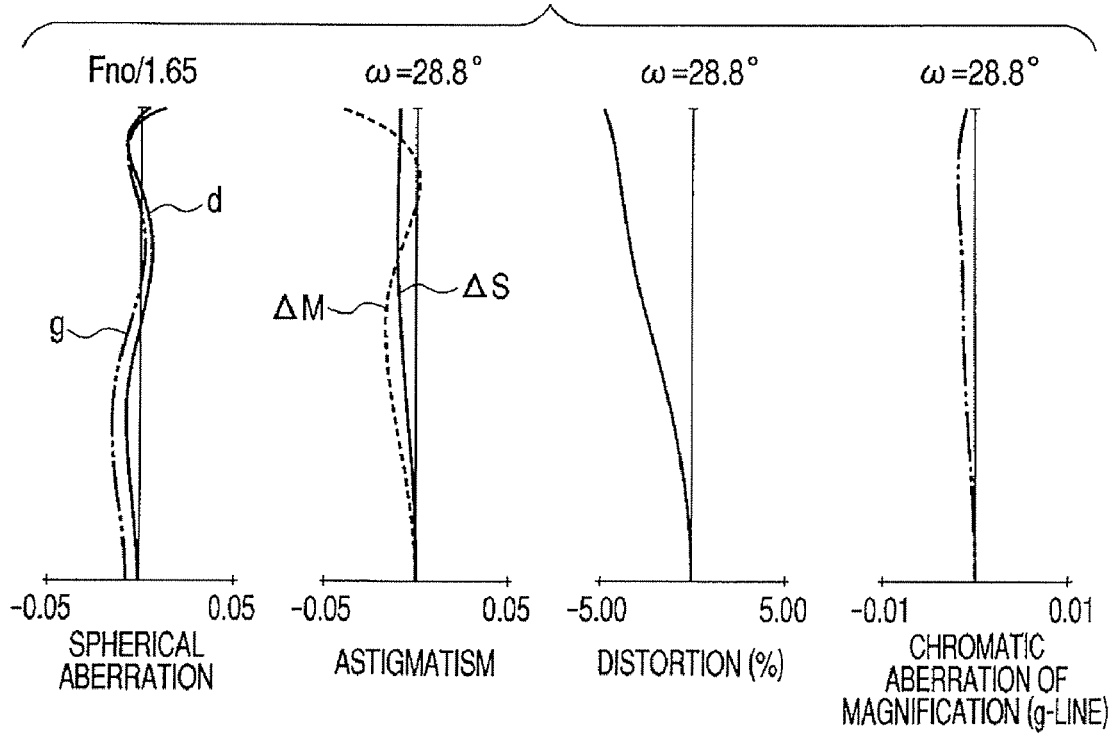
FIG. 2 is a graph showing various aberrations of the zoom lens at the wide-angle end according to Embodiment 1 of the present invention.
Figure 3:
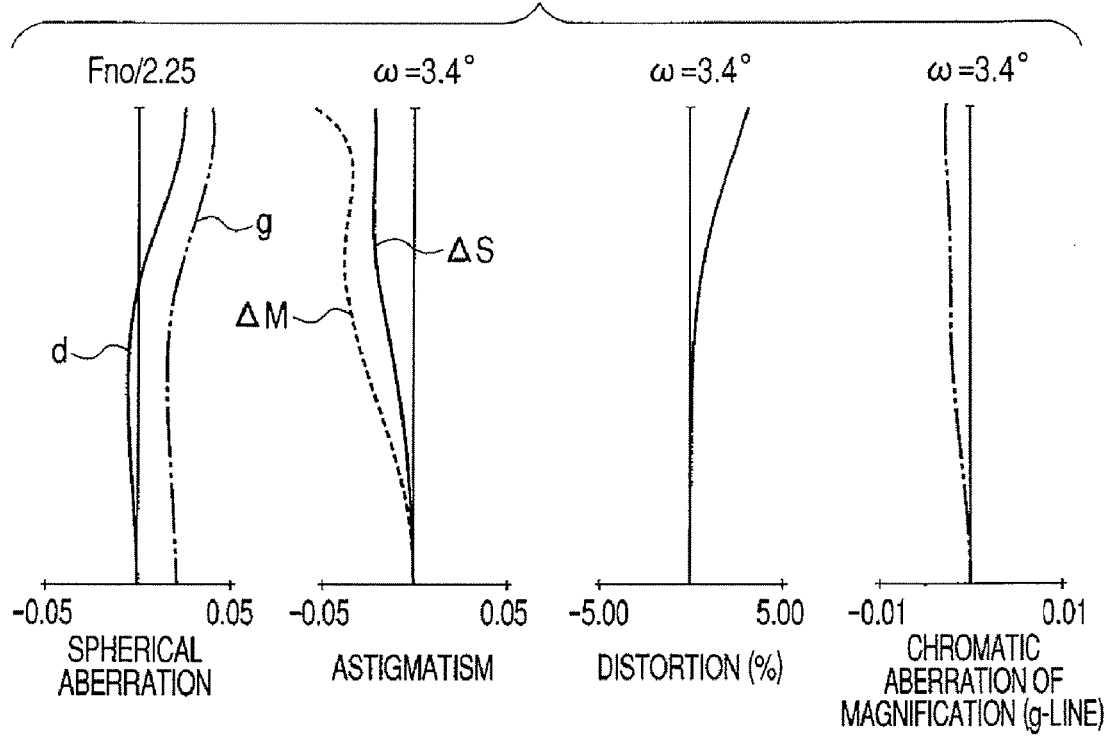
FIG. 3 is a graph showing various aberrations of the zoom lens at an intermediate zoom position according to Embodiment 1 of the present invention.
Figure 4:
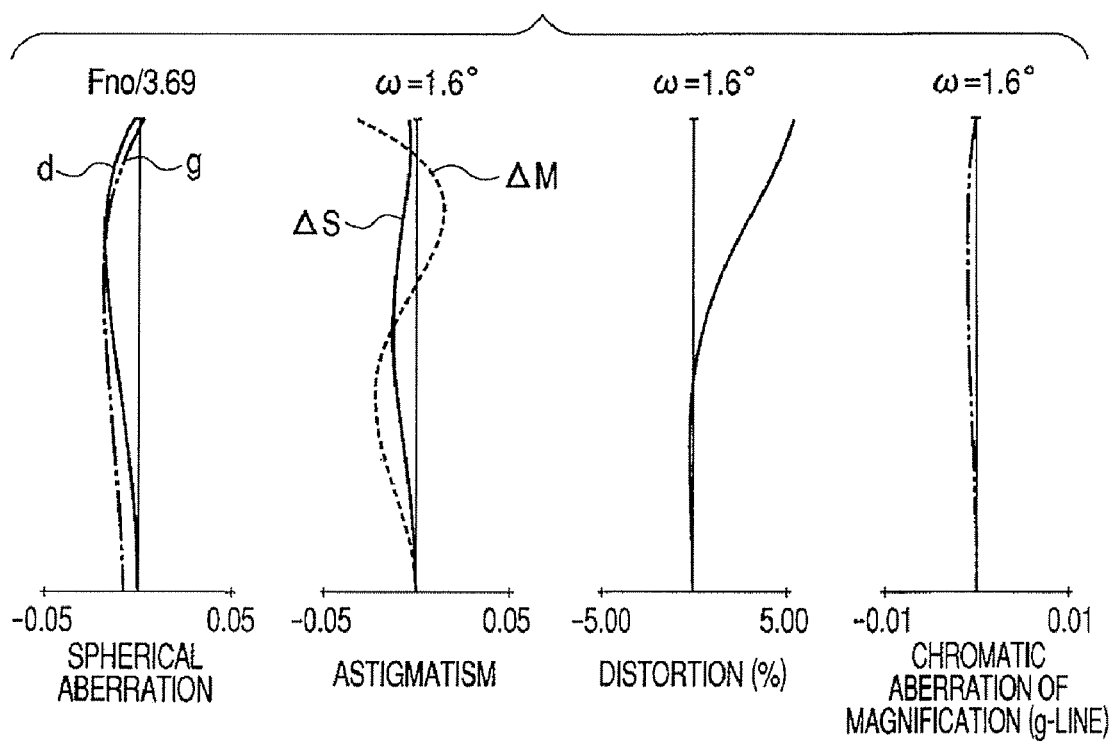
FIG. 4 is a graph showing various aberrations of the zoom lens at a telephoto end according to Embodiment 1 of the present invention.

FIG. 1 is a lens sectional view showing a zoom lens at a wide-angle end according to Embodiment 1 of the present invention. FIGS. 2, 3, and 4 are graphs showing aberrations of the zoom lens at a wide-angle end, an intermediate zoom position, and a telephoto end according to Embodiment 1, respectively.

Figure 5:
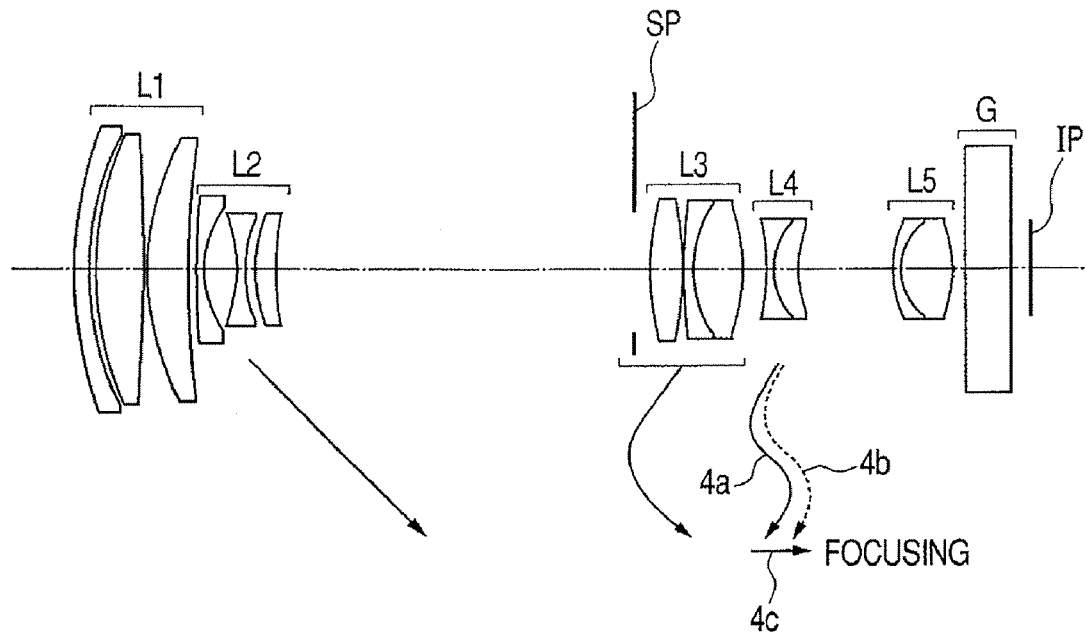
FIG. 5 is a lens sectional view showing a zoom lens at a wide-angle end according to Embodiment 2 of the present invention.
Figure 6:
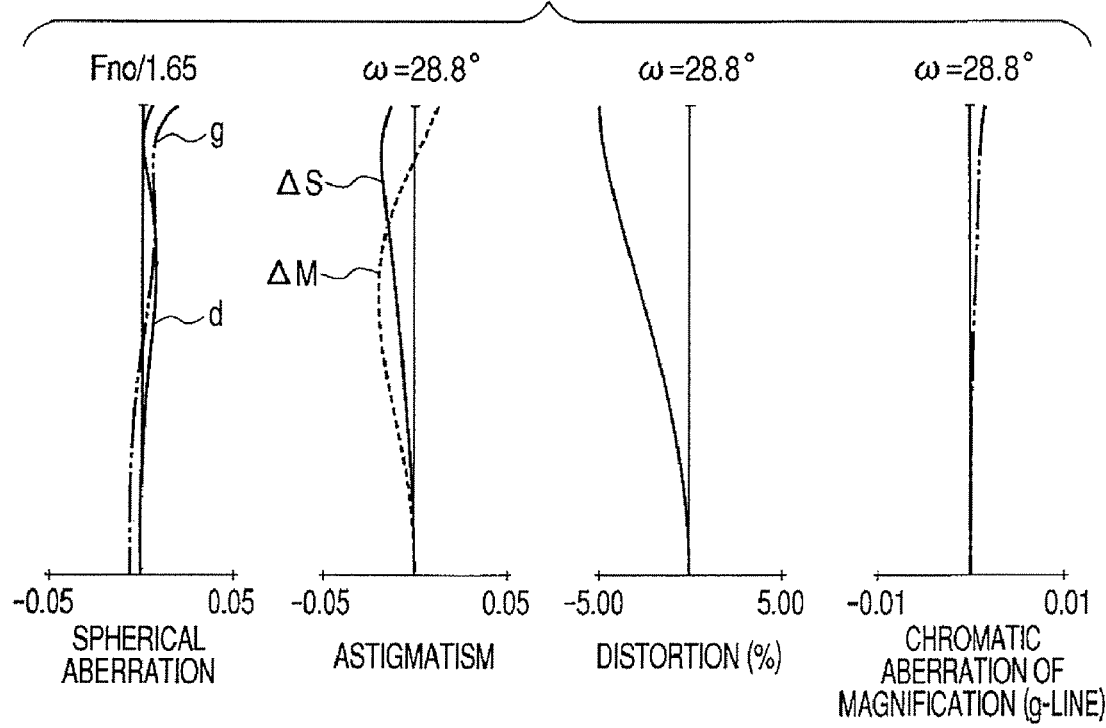
FIG. 6 is a graph showing various aberrations of the zoom lens at the wide-angle end according to Embodiment 2 of the present invention.
Figure 7:
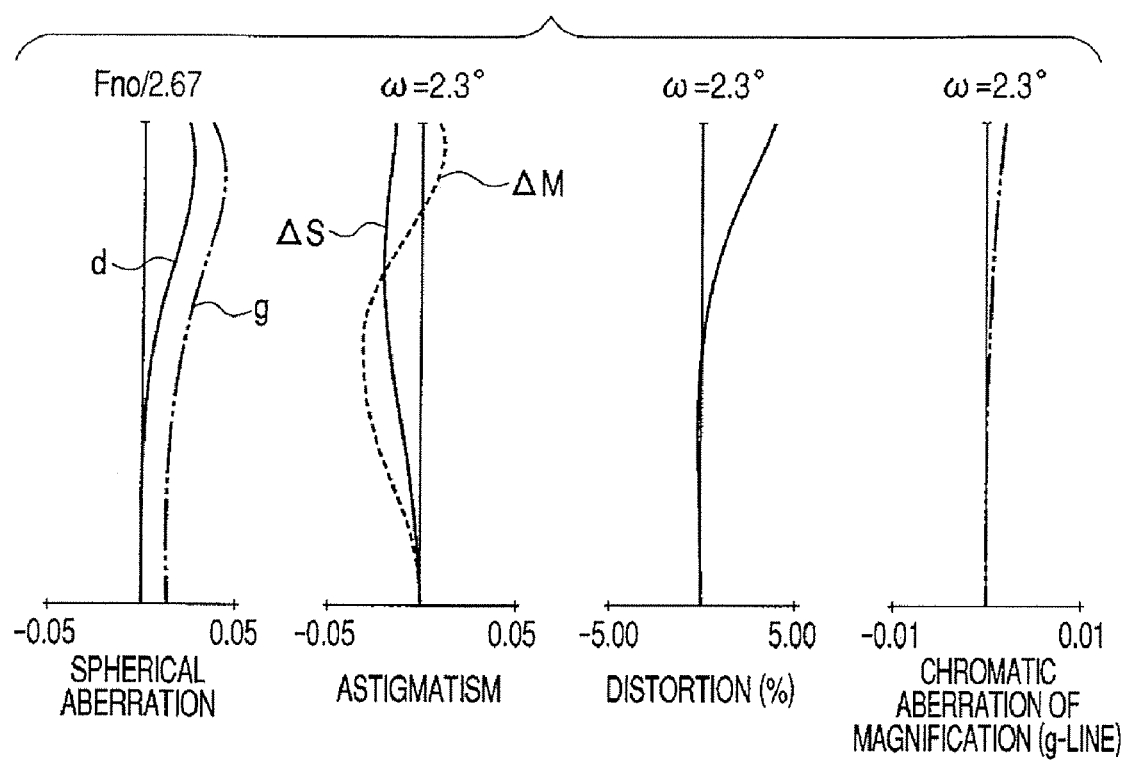
FIG. 7 is a graph showing various aberrations of the zoom lens at an intermediate zoom position according to Embodiment 2 of the present invention.
Figure 8:
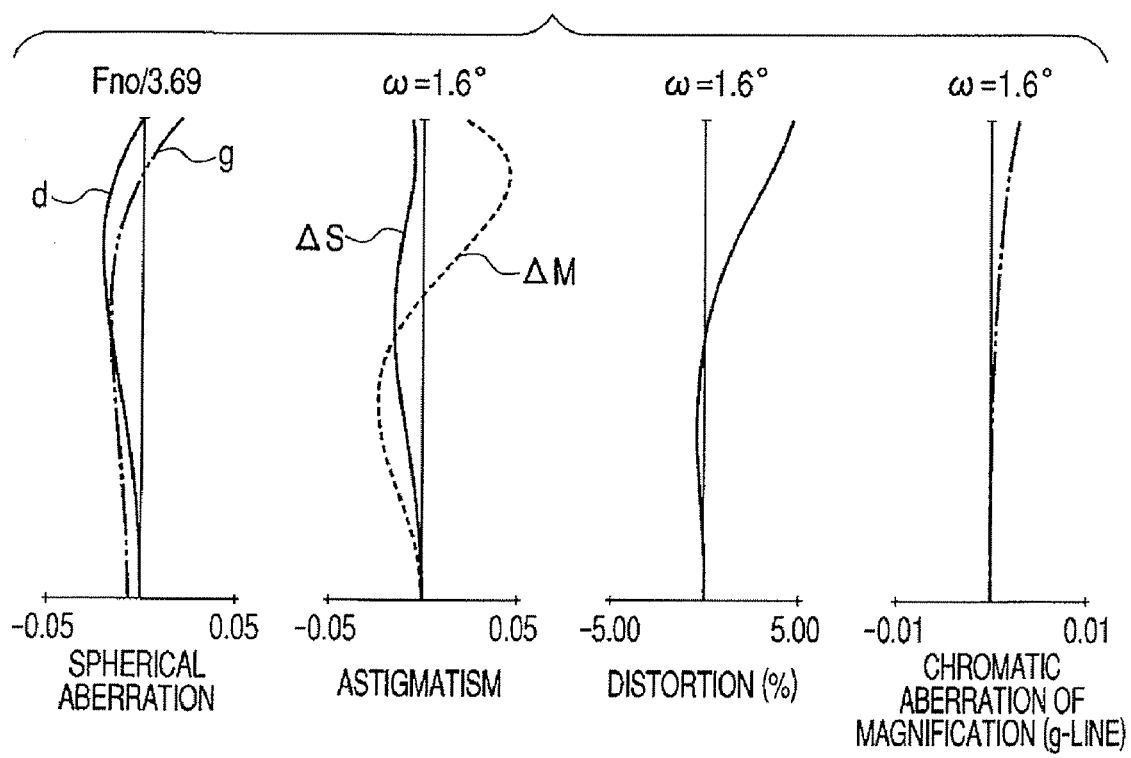
FIG. 8 is a graph showing various aberrations of the zoom lens at a telephoto end according to Embodiment 2 of the present invention.

FIG. 5 is a lens sectional view showing a zoom lens at a wide-angle end according to Embodiment 2 of the present invention. FIGS. 6, 7, and 8 are graphs showing aberrations of the zoom lens at a wide-angle end, an intermediate zoom position, and a telephoto end according to Embodiment 2, respectively.

Figure 9:
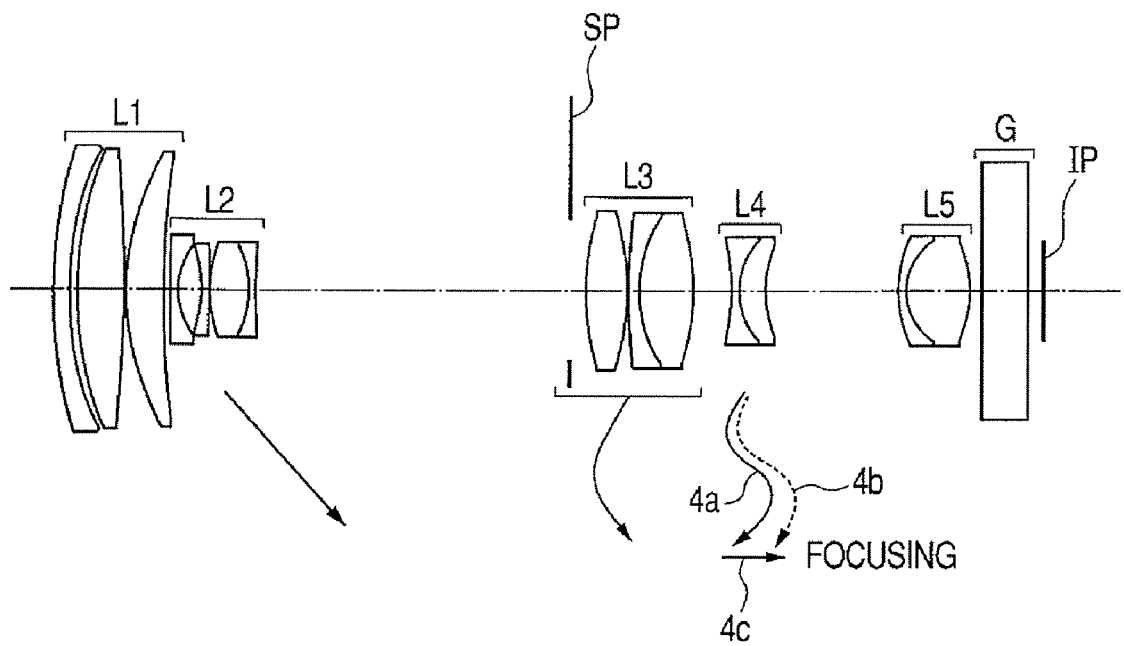
FIG. 9 is a lens sectional view showing a zoom lens at a wide-angle end according to Embodiment 3 of the present invention.
Figure 10:
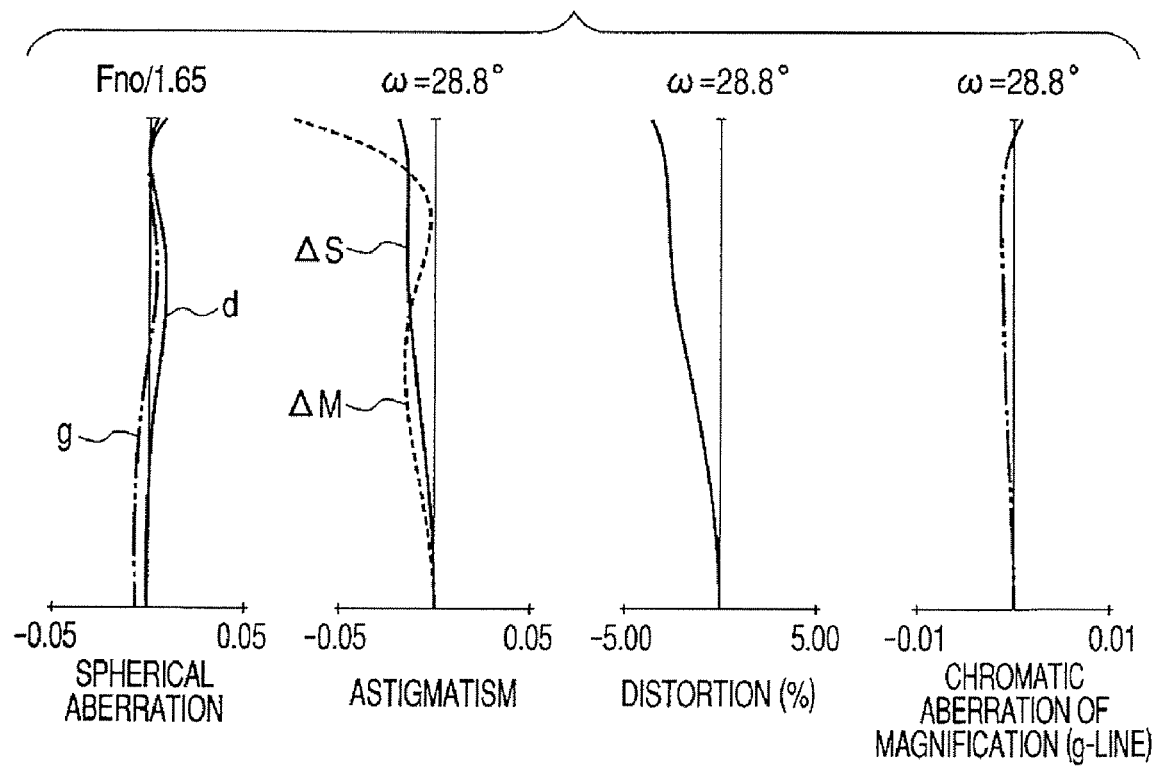
FIG. 10 is a graph showing various aberrations of the zoom lens at the wide-angle end according to Embodiment 3 of the present invention.
Figure 11:
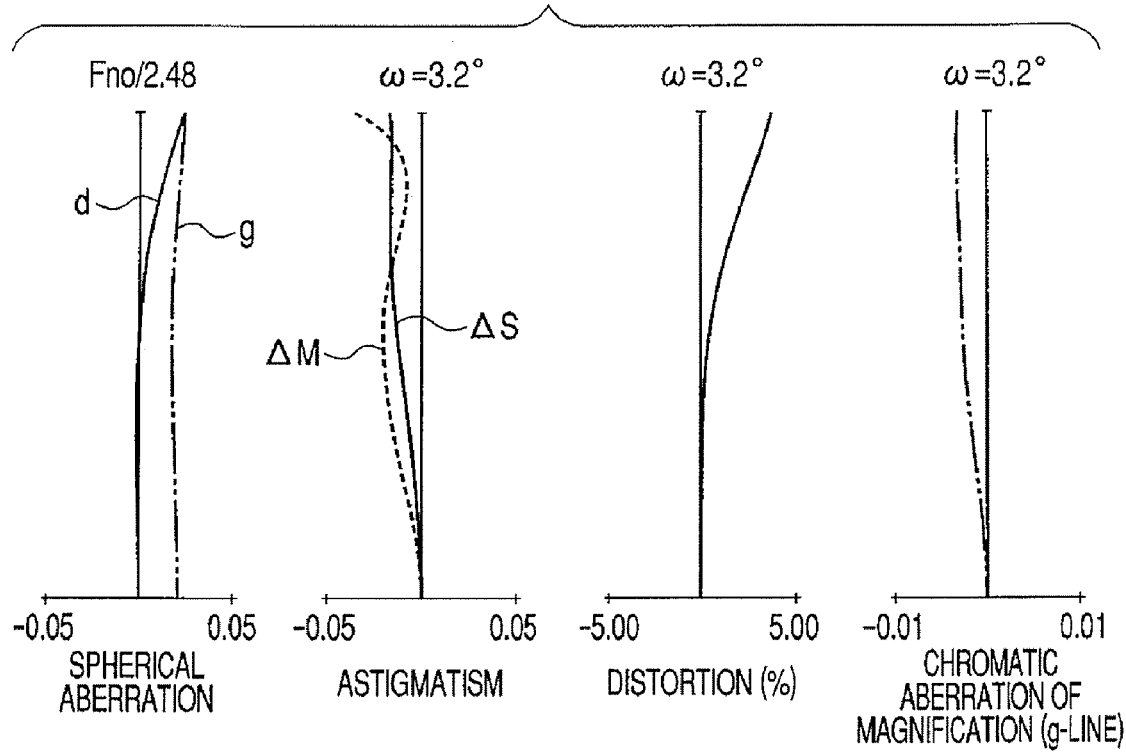
FIG. 11 is a graph showing various aberrations of the zoom lens at an intermediate zoom position according to Embodiment 3 of the present invention.
Figure 12:
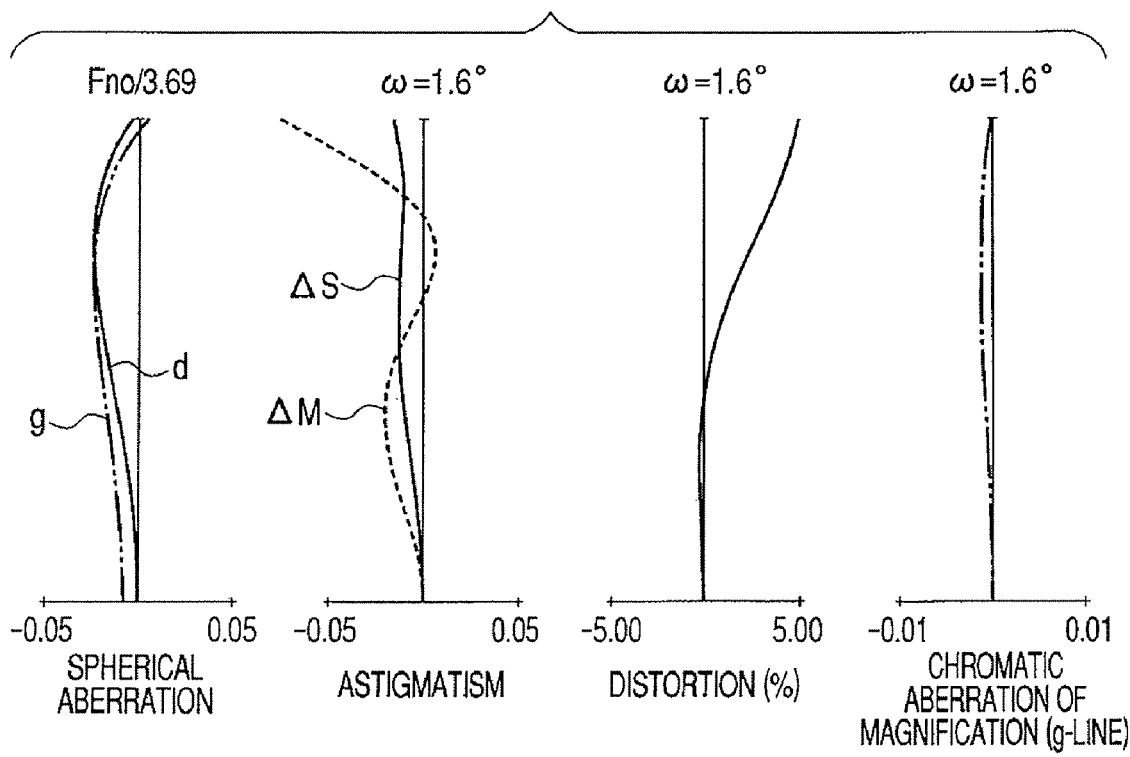
FIG. 12 is a graph showing various aberrations of the zoom lens at a telephoto end according to Embodiment 3 of the present invention.

FIG. 9 is a lens sectional view showing a zoom lens at a wide-angle end according to Embodiment 3 of the present invention. FIGS. 10, 11, and 12 are graphs showing aberrations of the zoom lens at a wide-angle end, an intermediate zoom position, and a telephoto end according to Embodiment 3, respectively.

Figure 13:
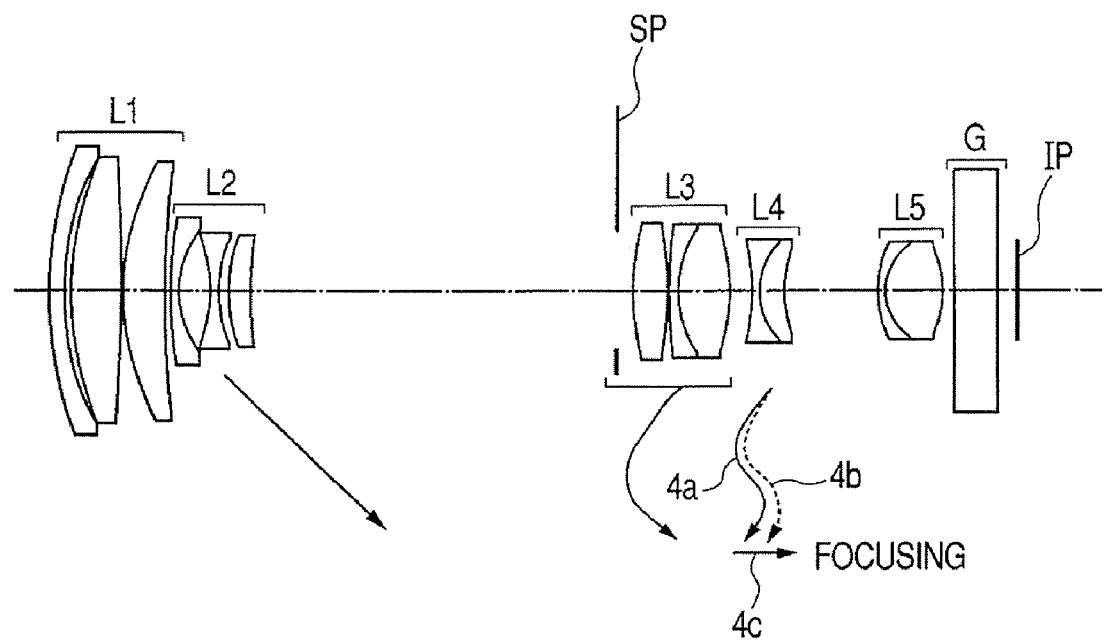
FIG. 13 is a lens sectional view showing a zoom lens at a wide-angle end according to Embodiment 4 of the present invention.
Figure 14:
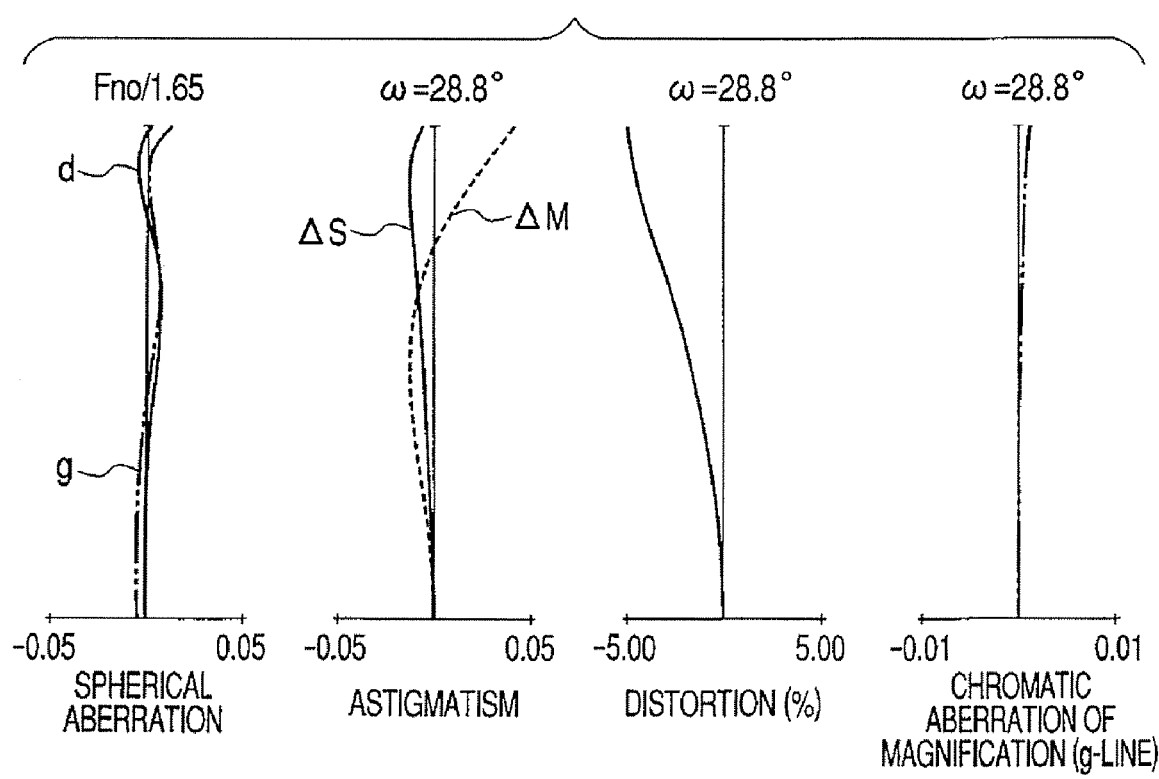
FIG. 14 is a graph showing various aberrations of the zoom lens at the wide-angle end according to Embodiment 4 of the present invention.
Figure 15:
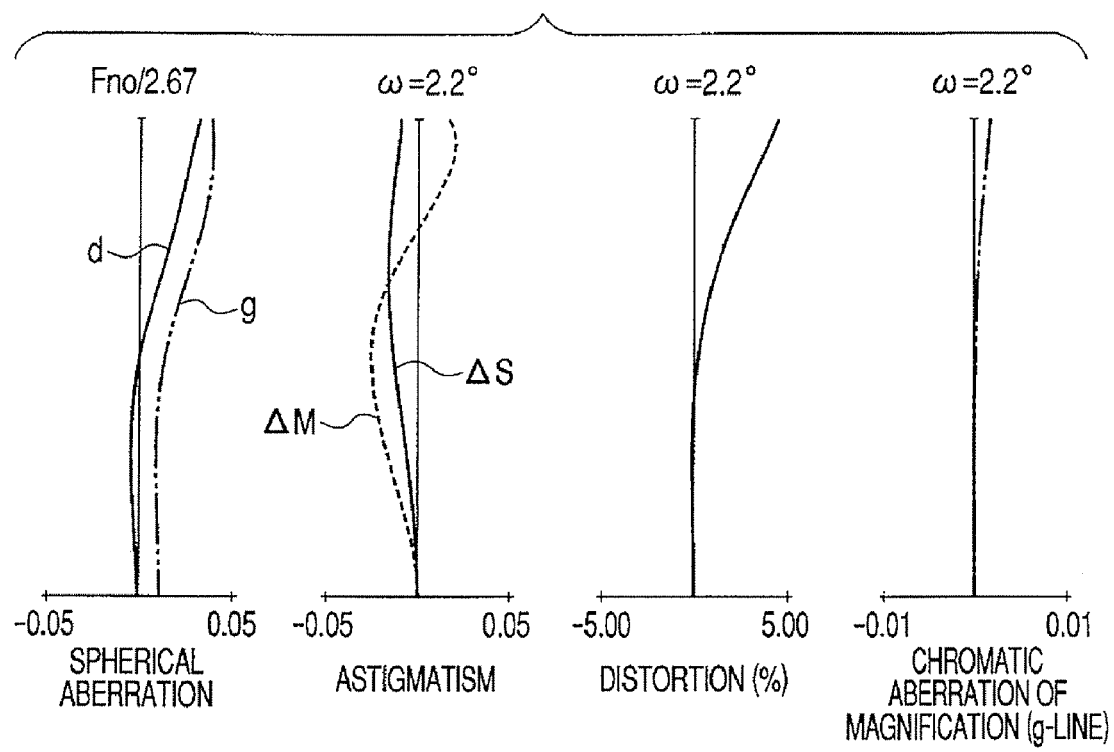
FIG. 15 is a graph showing various aberrations of the zoom lens at an intermediate zoom position according to Embodiment 4 of the present invention.
Figure 16:
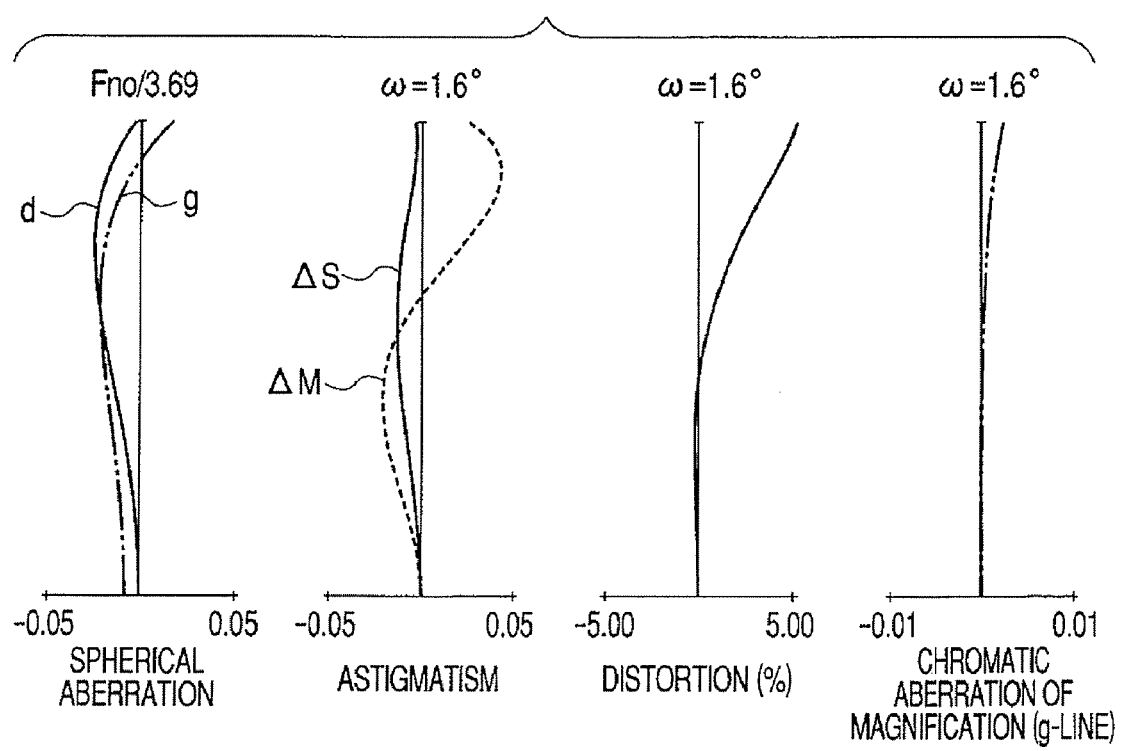
FIG. 16 is a graph showing various aberrations of the zoom lens at a telephoto end according to Embodiment 4 of the present invention.

FIG. 13 is a lens sectional view showing a zoom lens at a wide angle end according to Embodiment 4 of the present invention. FIGS. 14, 15, and 16 are graphs showing aberrations of the zoom lens at a wide-angle end, an intermediate zoom position, and a telephoto end according to Embodiment 4, respectively.

Figure 17:
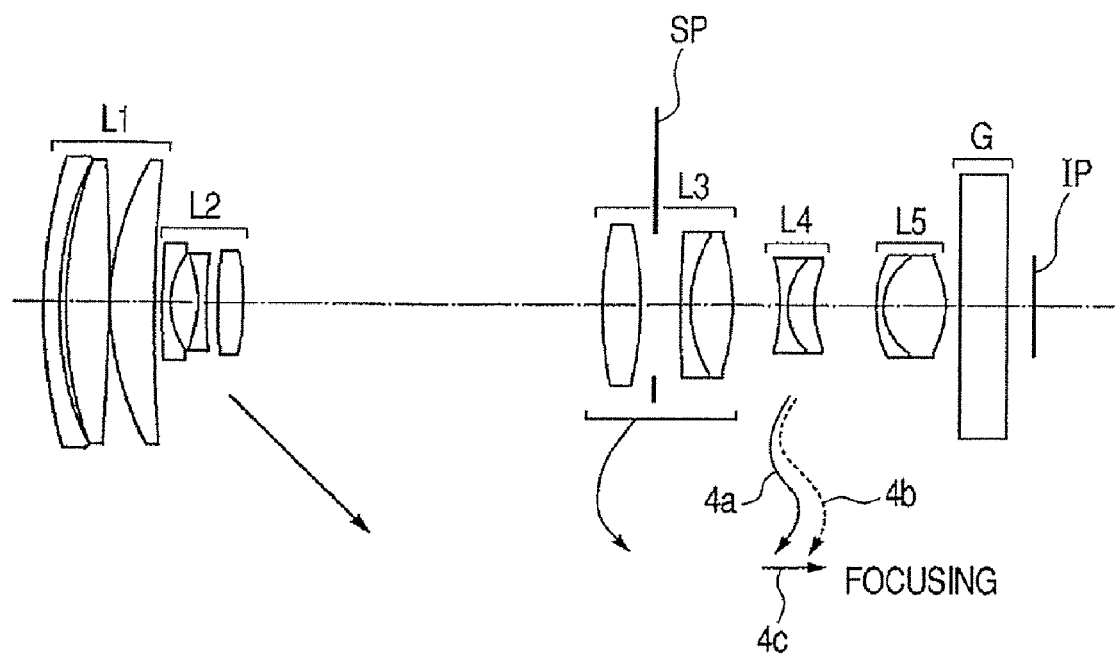
FIG. 17 is a lens sectional view showing a zoom lens at a wide-angle end according to Embodiment 5 of the present invention.
Figure 18:
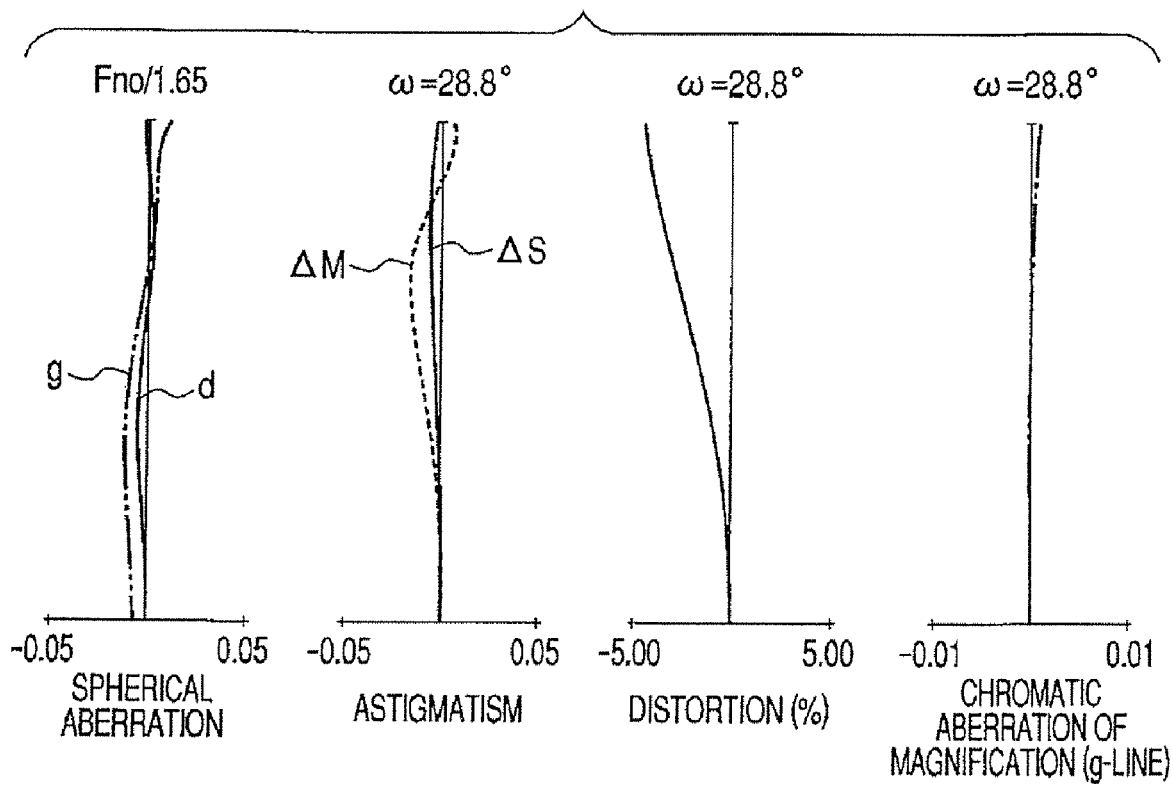
FIG. 18 is a graph showing various aberrations of the zoom lens at the wide-angle end according to Embodiment 5 of the present invention.
Figure 19:
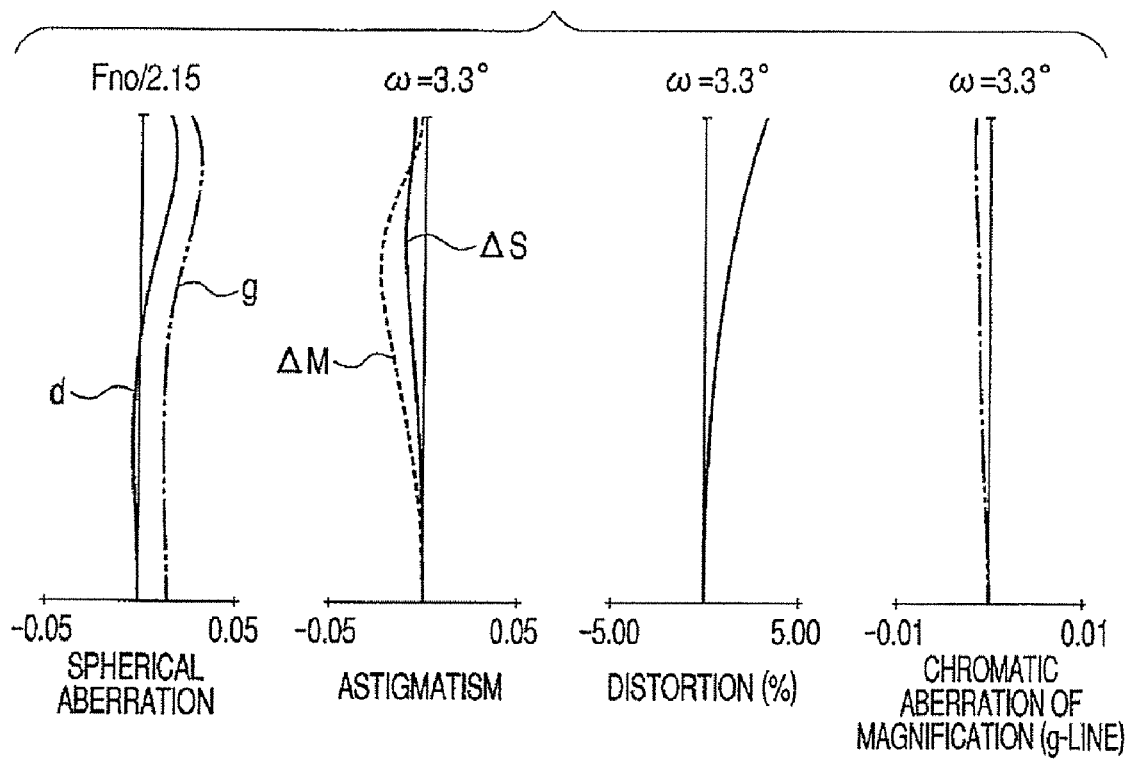
FIG. 19 is a graph showing various aberrations of the zoom lens at an intermediate zoom position according to Embodiment 5 of the present invention.
Figure 20:
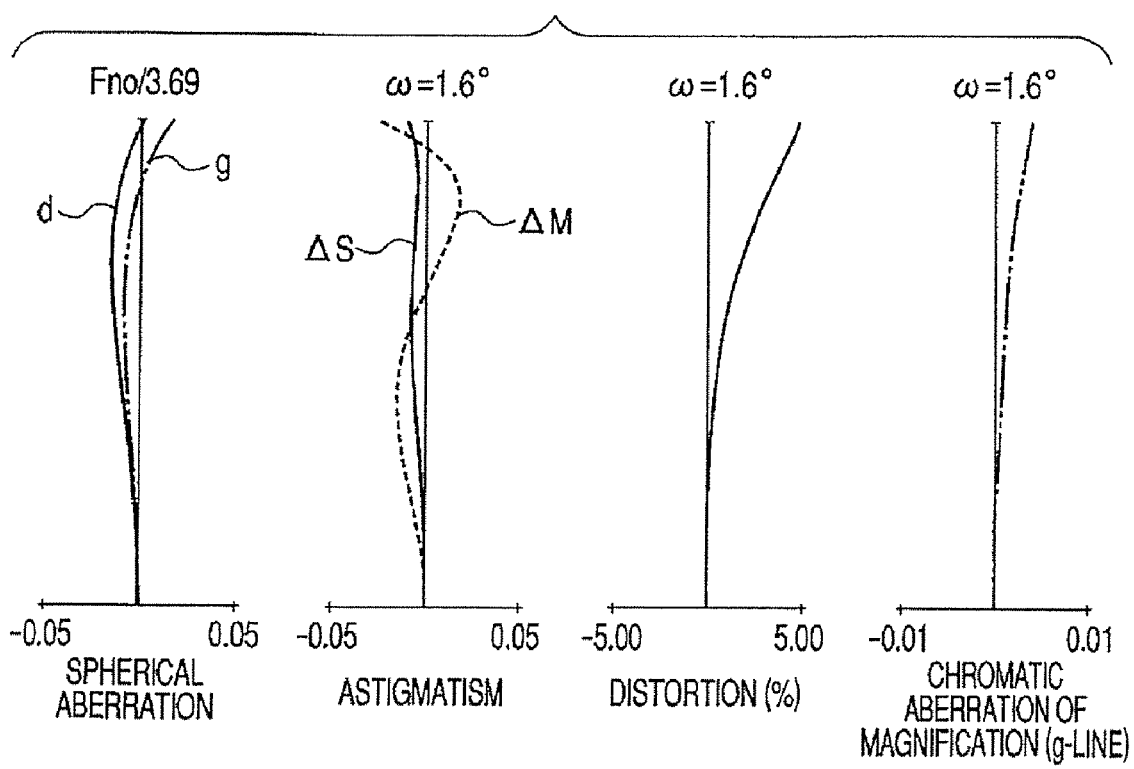
FIG. 20 is a graph showing various aberrations of the zoom lens at a telephoto end according to Embodiment 5 of the present invention.

FIG. 17 is a lens sectional view showing a zoom lens at a wide-angle end according to Embodiment 5 of the present invention. FIGS. 18, 19, and 20 are graphs showing aberrations of the zoom lens at a wide-angle end, an intermediate zoom position, and a telephoto end according to Embodiment 5, respectively.

Figure 21:
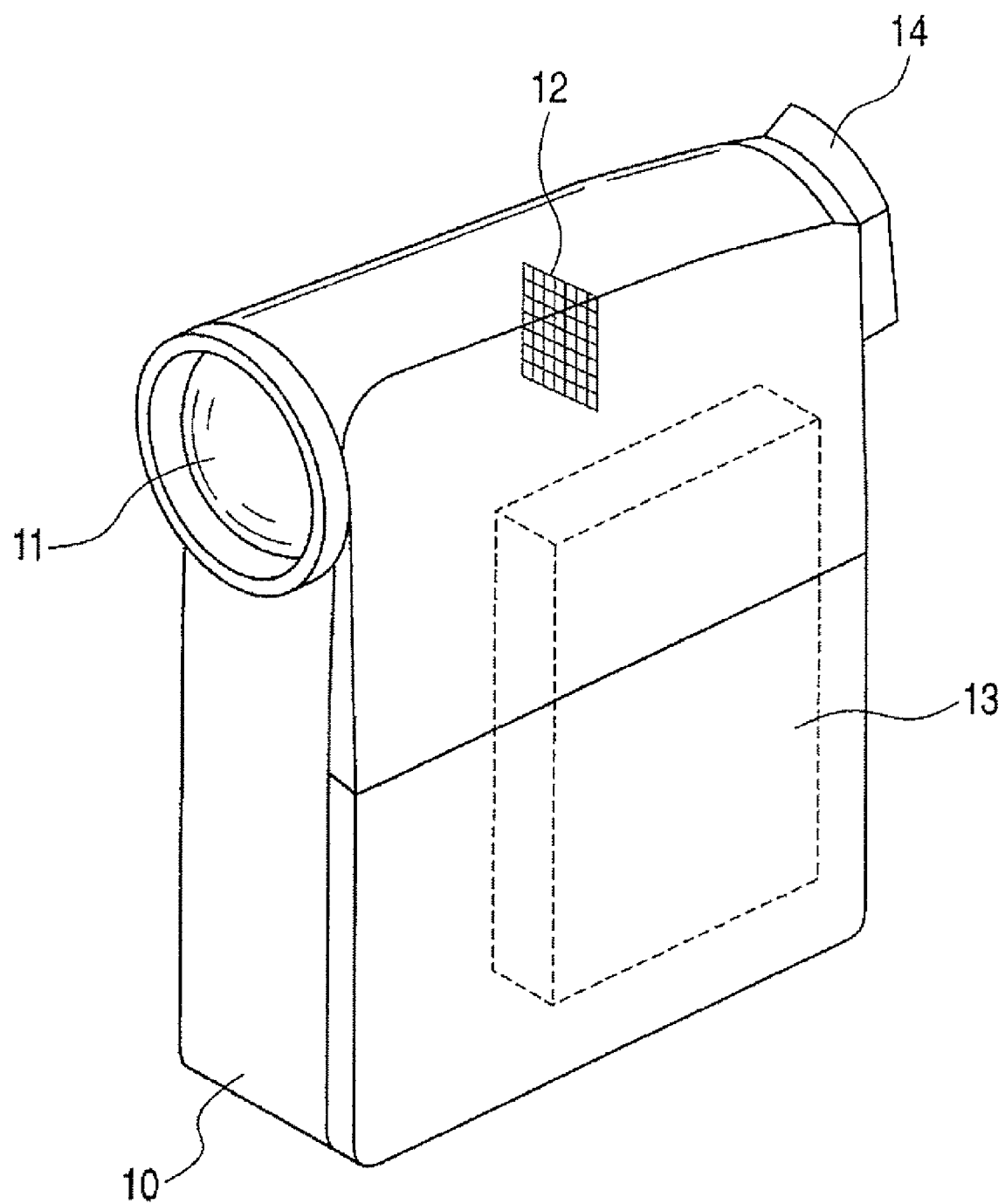
FIG. 21 is a main part schematic view showing an image pick up apparatus according to the present invention.

FIG. 21 is a main part schematic view showing a video camera (image pick up apparatus) including the zoom lens according to the present invention.

The zoom lens according to each of the embodiments is a photographing lens used for the image pick up apparatus. In each of the lens sectional views of FIGS. 1, 5, 9, 13, and 17, the left is an object side (front) and the right is an image side (rear). In the lens sectional views, reference symbol L1 denotes a first lens unit having positive refractive power (optical power), L2 denotes a second lens unit having negative refractive power, L3 denotes a third lens unit having positive refractive power, L4 denotes a fourth lens unit having negative refractive power, and L5 denotes a fifth lens unit having positive refractive power.

In the lens sectional views, reference symbol SP denotes an aperture stop, G denotes a glass block such as a filter or a face plate, and IP denotes an image plane.

When the zoom lens according to the present invention is used as a photographing optical system of a video camera or a digital still camera, an image pick up surface of a solid-state image pick up element (photoelectric transducer) such as a CCD sensor or a CMOS sensor corresponds to the image plane IP. When the zoom lens according to the present invention is used as a photographing optical system of a silver halide film camera, a film surface thereof corresponds to the image plane IP.

In the aberration graphs shown in FIGS. 2 to 4, 6 to 8, 10 to 12, and 14 to 16, reference symbols d and g denote a d-line and a g-line, respectively. References symbols ΔM and ΔS denote a meridional image plane and a sagittal image plane, respectively. Chromatic aberration of magnification is shown with respect to the g-line.

In the aberration graphs, reference symbol ω denotes a half field angle and Fno denotes an F-number.

In each of the following embodiments, the wide-angle end and the telephoto end correspond to zoom positions in a case where the second lens unit which is a lens unit for magnification and moves during zooming is located in each of both ends of a range in which the second lens unit is movable on the optical axis in view of the mechanism of a lens barrel.

In each of the embodiments, as shown by arrows in the each lens sectional view, during zooming from the wide-angle end to the telephoto end, the second lens unit L2 moves toward the image side, the third lens unit L3 moves along a locus convex toward the object side, and the fourth lens unit L4 moves along an S-shaped locus.

The first lens unit L1 does not move for zooming.

The fourth lens unit L4 moves during zooming, thereby correcting an image plane variation caused by a change in magnification. The fourth lens unit L4 moves for focusing.

When focusing is to be performed from an infinitely distant object to a nearest object at the telephoto end, the fourth lens unit L4 moves backward as shown by the arrow 4c in each of the lens sectional views.

A solid curve 4a with respect to the fourth lens unit L4 indicates a movement locus for correcting the image plane variation caused by the change in magnification during zooming from the wide-angle end to the telephoto end in a state in which focusing is performed on the infinitely distant object. A broken curve 4b with respect to the fourth lens unit L4 indicates a movement locus for correcting the image plane variation caused by the change in magnification during zooming from the wide-angle end to the telephoto end in a state in which focusing is performed on the nearest object.

In each of the embodiments, the fourth lens unit L4 which is lightweight is used for focusing, so that a load on an actuator for driving a focusing lens unit is reduced to facilitate speedy auto-focus.

In each of the embodiments, the third lens unit L3 and the aperture stop SP are integrally moved along the locus convex to the object side during zooming. Therefore, a reduction in front lens diameter is achieved while a sufficient peripheral light beam is ensured in the intermediate zoom position (intermediate position between the wide-angle end and the telephoto end).

In particular, the aperture stop SP is located closer to the object side than the third lens unit L3 or in an inner portion (space between lenses) of the third lens unit L3 and moves together with the third lens unit L3. Therefore, a relative distance with the first lens unit L1 shortens to lower a light beam height of an off-axis light beam in the case where it passes through the first lens unit L1, so that an effective diameter of the first lens unit L1 reduces. Thus, a reduction in size of the entire lens system is achieved.

In each of the embodiments, an anti-vibration lens unit is used as the entire third lens unit L3 or for a part thereof. The anti-vibration lens unit is shifted (decentered in parallel) in a direction orthogonal to an optical axis to have a component in a direction perpendicular to the optical axis or rotated (decentered by rotation) about an axis orthogonal to the optical axis, thereby moving an image plane (shifting an image position) of a subject image. Therefore, a blurred image caused when the zoom lens vibrates is corrected. Note that the aperture stop SP does not move for this correction.

In each of the embodiments, all the following conditions are satisfied. However, according to the present invention, in the case where at least one of the conditions is satisfied, such as the case where at least one of three principal conditions (1) to (3) is satisfied, an effect corresponding to the (satisfied) condition(s) is obtained for each configuration.

At least one of the following conditions is satisfied, $$0.2 < |f2/fA| < 0.4 \tag{1}$$

$$2.10 < e4T/fw < 4.35 \tag{2}$$

$$0.7 < |f3/f4| < 1.3 \tag{3}$$

$$1.5 < M2/M3 < 5.4 \tag{4}$$

$$1.76 < Nn < 2.01 \tag{5}$$

$$0.46 < |R22/R23| < 0.79 \tag{6}$$

$$1.7 \times 10^{-3} < |(1-\beta a) \cdot \beta R| \cdot EM/ft < 0.05 \tag{7}$$

where $$fA = \sqrt{fw \cdot ft}$$

fw and ft represent a focal length of the entire system at the wide-angle end and a focal length thereof at the telephoto end, respectively, f2, f3, and f4 represent a focal length of the second lens unit L2, a focal length of the third lens unit L3, and a focal length of the fourth lens unit L4, respectively, e4T represents a principal point interval between the fourth lens unit L4 and the fifth lens unit L5 in the case where focusing is performed on the infinitely distant object at the telephoto end, M2 represents a movement amount of the second lens unit L2 in the case where zooming is performed from the wide-angle end to the telephoto end, M3 represents a distance on the optical axis between a position of the third lens unit L3 in the case where it is located at the most object side and a position thereof in the case where it is located at the most image side, Nn represents an average refractive index of lens materials of the second lens unit L2, R2i represents a curvature radius of an i-th lens surface counted from a lens surface of the second lens unit L2 which is located at the most object side (paraxial curvature radius in the case where the lens surface has an aspherical shape), EM and βa represent a maximum movement amount and a photographing magnification of the anti-vibration lens unit at the telephoto end in the case where the anti-vibration lens unit is used as the entire third lens unit L3 and moved to have a component in the direction perpendicular to the optical axis, thereby changing a position of an image formed by the zoom lens, respectively, and βR represents a photographing magnification of a lens located closer to the image side than the anti-vibration lens unit.

Next, the technical meanings of the above-mentioned respective conditional expressions will be described.

The conditional expression (1) is used to adjust the focal length of the second lens unit L2 to an adequate value.

When the focal length of the second lens unit L2 becomes too long and thus exceeds an upper limit value of the conditional expression (1), it is preferable in view of aberration correction. However, in order to obtain a high variable ratio (zoom ratio), it is necessary to increase a movement amount of the second lens unit L2 which is caused by zooming, with the result that the size of the entire lens system becomes larger, which is not preferable.

On the other hand, when the focal length of the second lens unit L2 becomes smaller than a lower limit value of the conditional expression (1), a Petzval sum increases in a negative direction to tilt the image plane. Therefore, it is difficult to maintain preferable optical performance over the entire screen.

The conditional expression (2) relates to a paraxial principal point interval between the fourth lens unit L4 and the fifth lens unit L5 at the telephoto end.

When the principal point interval exceeds an upper limit value of the conditional expression (2) and thus becomes too large, an unnecessary space on the optical axis increases to lengthen the entire lens length, which is not preferable. On the other hand, when the principal point interval becomes smaller than a lower limit value of the conditional expression (2) and thus is too narrow, it is difficult to ensure a feeding space of the fourth lens unit L4 for focusing on a close object.

The conditional expression (3) relates to a ratio between the focal length of the third lens unit L3 and the focal length of the fourth lens unit L4 and is mainly used to ensure a desirable back focus. When the ratio exceeds an upper limit value of the conditional expression (3) and thus the focal length of the third lens unit L3 becomes too long, the back focus is too long. When the ratio exceeds the upper limit value of the conditional expression (3) and thus the focal length of the fourth lens unit L4 becomes too short, an aberration variation caused by the movement of the fourth lens unit L4 during focusing becomes larger, which is not preferable.

On the other hand, when the ratio becomes smaller than a lower limit value of the conditional expression (3) and thus the focal length of the third lens unit L3 is too short, the back focus shortens. When the ratio becomes smaller than the lower limit value of the conditional expression (3) and thus the focal length of the fourth lens unit L4 is long, a movement amount of the fourth lens unit L4 which is caused by focusing becomes larger, so that the entire lens length lengthens, which is not preferable.

As described above, when any one of the conditional expressions (1) to (3) is satisfied, a reduction in size of the entire lens system can be achieved. When two or more conditional expressions are satisfied, a further reduction in size can be easily achieved. It is best to satisfy the three conditions.

The conditional expression (4) relates to a ratio between a movement amount of the second lens unit L2 and a movement amount of the third lens unit L3 which are caused by zooming and is used to balance both a reduction in effective diameter of the first lens unit L1 and shortening of the entire lens length while mainly an aberration variation caused during zooming is preferably corrected.

When the ratio exceeds an upper limit value of the conditional expression (4) and thus the movement amount of the second lens unit L2 increases, a distance between the first lens unit L1 and the aperture stop SP lengthens in a range between the intermediate focal position and the telephoto end. Therefore, a distance between an off-axis light beam and the lens optical axis increases, so that the effective diameter of the first lens unit L1 becomes larger, which is not preferable. On the other hand, when the ratio becomes smaller than a lower limit value of the conditional expression (4) and thus the movement amount of the second lens unit L2 reduces, it is difficult to obtain a desirable zoom ratio.

The conditional expression (5) is used to shorten the focal length of the second lens unit L2 by which a change in magnification is significantly influenced during zooming and relates to a refractive index of lens materials of the second lens unit L2.

An example of a method of increasing a zoom ratio normally includes a method of shortening the focal length of the second lens unit L2. However, when the focal length is shortened without reason, the Petzval sum increases to tilt the image plane. In order to prevent the tilt of the image plane, it is important to increase the refractive index of constituent lens materials and to reduce the curvature of each lens surface.

When the refractive index exceeds an upper limit value of the conditional expression (5) and thus becomes larger, although preferable for the Petzval sum, the correction of coma and the like is insufficient.

On the other hand, when the refractive index becomes smaller than a lower limit value of the conditional expression (5), the Petzval sum increases in the negative direction, thereby tilting the image plane. Therefore, it is difficult to maintain preferable optical performance.

The conditional expression (6) is used to correct the coma, the field curvature, and flare in a balanced manner.

When |R22/R23| exceeds an upper limit value of the conditional expression (6), the coma becomes larger. On the other hand, when |R22/R23| is smaller than a lower limit value of the conditional expression (6), the image plane is curved so as to become concave to the object side, which is not preferable. When |R22/R23| is not within the range of the conditional expression (6), there is a problem in that the flare increases.

When $|(1-\beta a)\cdot \beta R|\cdot EM/ft$ becomes smaller than a lower limit value of the conditional expression (7), a correction amount for anti-vibration (displacement amount of image) is too small to obtain a sufficient anti-vibration effect. On the other hand, when $|(1-\beta a)\cdot \beta R|\cdot EM/ft$ exceeds an upper limit value of the conditional expression (7), it is necessary to increase a diameter of a correction lens or a diameter of a correction lens unit to a reasonable value. Therefore, a load on a drive mechanism such as an actuator becomes larger, which is not preferable.

In the present invention, it is more preferable to set the following expressions (1a) to (7a) instead of the numerical ranges of the above-mentioned conditional expressions (1) to (7).

$$0.25<|f2/fA|<0.39 \quad (1a)$$

$$2.3<e4T/fw<4.1 \quad (2a)$$

$$0.74<|f3/f4|<1.2 \quad (3a)$$

$$1.6<M2/M3<5.0 \quad (4a)$$

$$1.765<Nn<1.95 \quad (5a)$$

$$0.47<|R22/R23|<0.76 \quad (6a)$$

$$6\times10^{-3}<|(1-\beta a)\cdot \beta R|\cdot EM/ft<0.03 \quad (7a)$$

As described in each of the embodiments, in the lens system having a high zoom ratio such as a zoom ratio of 20 times, the focal length at the telephoto end reaches approximately 1000 mm in 35-mm film conversion. Then, the correction of chromatic aberration becomes an important purpose.

Therefore, according to the structure in each of the embodiments, the first lens unit L1 includes at least one negative lens and two or more positive lenses. An average Abbe number of materials of the respective positive lenses is equal to or larger than 68 and an Abbe number of a material of at least one positive lens is equal to or larger than 70. Thus, the chromatic aberration is preferably corrected by the structure. This is because the lens structure of the first lens unit L1 significantly influences, of various aberrations, in particular, axial chromatic aberration at the telephoto end.

In each of the embodiments, the second lens unit L2 includes, in order from the object side to the image side, a first lens whose surface on the image plane side is concave and which has negative refractive power, a second lens whose surface on the object side is concave and which has negative refractive power, and a third lens whose surface on the object side is convex and which has positive refractive power.

When the zoom ratio is increased by the zoom type as described in each of the embodiments, it is necessary to increase the movement amount of the second lens unit L2 by which a change in magnification is significantly influenced during zooming or to shorten the focal length of the second lens unit L2 (to increase power).

However, the method of increasing the movement amount of the second lens unit L2 is not preferable because of an increase in size of the entire lens system. When the method of shortening the focal length of the second lens unit L2 is performed, although the size of the entire lens system does not increase, a large load with respect to a refractive power is placed on the second lens unit L2. Therefore, it is difficult to maintain preferable optical performance. Thus, in each of the embodiments, the second lens unit L2 is composed of the first lens, the second lens, and the third lens, thereby maintaining the preferable optical performance.

The refractive power of the second lens unit L2 can also be made strong, with the result that the movement amount of the second lens unit L2 during zooming can be reduced to shorten the entire lens length.

The second lens unit L2 may be provided with an aspherical surface, so that off-axis optical performance can be improved. The aspherical surface of the second lens unit L2 may be located on a surface having a small curvature radius, such as the image side surface of the first lens of the negative refractive power, the object side surface of the second lens of the negative refractive power, or the object side surface of the third lens of the positive refractive power.

Therefore, various aberrations can be effectively corrected. In particular, an off-axis flare can be preferably corrected.

The aspherical shape is desirably a shape in which the refractive power reduces from the lens center to a lens peripheral portion.

In each of the embodiments, a lens unit having a small refractive power may be disposed on the object side of the first lens unit L1 or the image side of the fifth lens unit L5.

A teleconverter lens, a wide-converter lens, or the like may be disposed on the object side or the image side.

As described above, according to each of the embodiments, it is possible to obtain a zoom lens which is suitable for use in an electronic camera such as a video camera or a digital still camera in which an F number at the wide-angle end is approximately 1.6 and thus the aperture ratio is large and a front lens diameter is small while the zoom ratio is a high variable ratio of 20 times.

Hereinafter, numerical data in Numerical Embodiments 1 to 5 corresponding to Embodiments 1 to 5 will be described. In the respective numerical embodiments, "i" denotes a surface order counted from the object side, Ri denotes a curvature radius of an i-th surface, Di denotes an interval between the i-th surface and an (i+1)-th surface. In addition, Ni denotes a refractive index based on the d-line, and νi denotes the Abbe number based on the d-line.

In Numerical Embodiments 1 to 5, two surfaces closest to the image side are flat surfaces corresponding to optical blocks. Assume that a displacement from a surface vertex in the optical axis direction at a position corresponding to a height h from the optical axis is expressed by X. In this case, the aspherical shape is expressed by the following expression, $$x = \frac{(1/R)h^2}{1 + \sqrt{\{1 - (1+k)(h/R)^2\}}} + Bh^4 + Ch^6 + Dh^8 + Eh^{10} + Fh^{12},$$

where R denotes a paraxial curvature radius, k denotes a conic constant, and B, C, D, E, and F denote aspherical coefficients.

In addition, [e-X] indicates [×10$^{-X}$]. Further, f denotes the focal length, Fno denotes an F-number, and ω denotes a half field angle. Table 1 shows the relationships between the above-mentioned respective conditional expressions and various numerical values in the numeral embodiments.

NUMERICAL EXAMPLE 1

| f = 1 to 19.50 Fno = 1.65 to 3.69 2ω = 57.5 to 3.2 | | | |
|---|---|---|---|
| R1 = 9.966 | D1 = 0.29 | N1 = 1.846660 | ν1 = 23.9 |
| R2 = 6.564 | D2 = 0.12 | | |
| R3 = 7.630 | D3 = 0.82 | N2 = 1.433870 | ν2 = 95.1 |
| R4 = −46.775 | D4 = 0.05 | | |
| R5 = 5.371 | D5 = 0.88 | N3 = 1.603112 | ν3 = 60.6 |
| R6 = 23.654 | D6 = Variable | | |
| R7 = 28.447 | D7 = 0.15 | N4 = 1.882997 | ν4 = 40.8 |
| R8 = 1.488 | D8 = 0.52 | | |
| R9 = −2.068 | D9 = 0.15 | N5 = 1.804000 | ν5 = 46.6 |
| R10 = 8.091 | D10 = 0.21 | | |
| R11 = 6.512 | D11 = 0.44 | N6 = 1.846660 | ν6 = 23.9 |
| R12 = −4.557 | D12 = Variable | | |
| R13 = Stop | D13 = 0.32 | | |
| R14 = 5.317 | D14 = 0.77 | N7 = 1.696797 | ν7 = 55.5 |
| R15 = −6.321 | D15 = 0.05 | | |
| R16 = 22.247 | D16 = 0.17 | N8 = 1.846659 | ν8 = 23.8 |
| R17 = 2.590 | D17 = 1.07 | N9 = 1.696797 | ν9 = 55.5 |
| R18 = −4.573 | D18 = Variable | | |
| R19 = −4.188 | D19 = 0.15 | N10 = 1.603112 | ν10 = 60.6 |
| R20 = 1.420 | D20 = 0.49 | N11 = 1.846660 | ν11 = 23.9 |
| R21 = 2.789 | D21 = Variable | | |
| R22 = 2.470 | D22 = 0.15 | N12 = 1.846660 | ν12 = 23.9 |
| R23 = 1.173 | D23 = 1.20 | N13 = 1.583126 | ν13 = 59.4 |
| R24 = −2.036 | D24 = 0.24 | | |
| R25 = ∞ | D25 = 0.90 | N14 = 1.516330 | ν14 = 64.2 |
| R26 = ∞ | | | |

-continued

| | Focal Length | | |
|---|---|---|---|
| Variable Interval | 1.00 | 9.31 | 19.50 |
| D6 | 0.14 | 5.50 | 6.52 |
| D12 | 6.31 | 0.91 | 0.24 |
| D18 | 0.89 | 2.28 | 0.28 |
| D21 | 2.01 | 0.65 | 2.31 |

Aspherical Coefficients

| | | | | |
|---|---|---|---|---|
| R14 | k = 1.48517e+00 | B = −7.64901e−03 | C = −1.46274e−03 | D = 5.13877e−04 |
| | E = 1.05015e−04 | F = −6.03397e−05 | | |
| R24 | k = −5.32458e+00 | B = −5.70017e−02 | C = 9.57074e−02 | D = −1.73295e−02 |
| | E = −1.41032e−01 | F = 1.00773e−01 | | |

NUMERICAL EXAMPLE 2

| f = 1 to 19.74 Fno = 1.65 to 3.69 2ω = 57.5 to 3.2 | | | |
|---|---|---|---|
| R1 = 8.823 | D1 = 0.29 | N1 = 1.846660 | ν1 = 23.9 |
| R2 = 6.520 | D2 = 0.12 | | |
| R3 = 7.080 | D3 = 0.97 | N2 = 1.433870 | ν2 = 95.1 |
| R4 = −35.977 | D4 = 0.05 | | |
| R5 = 5.567 | D5 = 0.85 | N3 = 1.496999 | ν3 = 81.5 |
| R6 = 21.044 | D6 = Variable | | |
| R7 = 14.019 | D7 = 0.15 | N4 = 1.772499 | ν4 = 49.6 |
| R8 = 2.002 | D8 = 0.71 | | |
| R9 = −3.012 | D9 = 0.15 | N5 = 1.603112 | ν5 = 60.6 |
| R10 = 2.809 | D10 = 0.21 | | |
| R11 = 3.268 | D11 = 0.44 | N6 = 1.922860 | ν6 = 18.9 |
| R12 = 8.555 | D12 = Variable | | |
| R13 = Stop | D13 = 0.32 | | |
| R14 = 4.870 | D14 = 0.69 | N7 = 1.696797 | ν7 = 55.5 |
| R15 = −8.875 | D15 = 0.05 | | |
| R16 = 11.966 | D16 = 0.17 | N8 = 1.846659 | ν8 = 23.8 |
| R17 = 2.325 | D17 = 1.05 | N9 = 1.696797 | ν9 = 55.5 |
| R18 = −3.871 | D18 = Variable | | |
| R19 = −4.687 | D19 = 0.15 | N10 = 1.603112 | ν10 = 60.6 |
| R20 = 1.478 | D20 = 0.49 | N11 = 1.846660 | ν11 = 23.9 |
| R21 = 2.649 | D21 = Variable | | |
| R22 = 2.381 | D22 = 0.15 | N12 = 1.846660 | ν12 = 23.9 |
| R23 = 1.148 | D23 = 1.05 | N13 = 1.583126 | ν13 = 59.4 |
| R24 = −2.582 | D24 = 0.24 | | |
| R25 = ∞ | D25 = 0.90 | N14 = 1.516330 | ν14 = 64.2 |
| R26 = ∞ | | | |

| | Focal Length | | |
|---|---|---|---|
| Variable Interval | 1.00 | 13.73 | 19.74 |
| D6 | 0.15 | 5.20 | 6.16 |
| D12 | 7.15 | 0.24 | 0.19 |
| D18 | 0.47 | 1.94 | 0.22 |
| D21 | 1.91 | 2.30 | 3.11 |

Aspherical Coefficients

| | | | | |
|---|---|---|---|---|
| R14 | k = 3.03353e+00 | B = −1.17616e−02 | C = −7.78876e−04 | D = 3.47377e−05 |
| | E = 1.53028e−04 | F = −6.81582e−05 | | |
| R24 | k = −2.13890e+00 | B = −2.59604e−02 | C = 7.58571e−02 | D = −2.45756e−02 |
| | E = −9.17900e−02 | F = 6.35268e−02 | | |

NUMERICAL EXAMPLE 3

| f = 1 to 19.50 Fno = 1.65 to 3.69 2ω = 57.5 to 3.2 | | | |
|---|---|---|---|
| R1 = 9.932 | D1 = 0.29 | N1 = 1.846660 | ν1 = 23.9 |
| R2 = 6.622 | D2 = 0.15 | | |
| R3 = 7.398 | D3 = 0.90 | N2 = 1.433870 | ν2 = 95.1 |
| R4 = −27.686 | D4 = 0.05 | | |
| R5 = 5.289 | D5 = 0.72 | N3 = 1.603112 | ν3 = 60.6 |
| R6 = 19.119 | D6 = Variable | | |
| R7 = 48.055 | D7 = 0.15 | N4 = 2.003300 | ν4 = 28.3 |
| R8 = 1.430 | D8 = 0.46 | | |
| R9 = −2.922 | D9 = 0.15 | N5 = 1.772499 | ν5 = 49.6 |
| R10 = −29.708 | D10 = 0.05 | | |
| R11 = 3.280 | D11 = 0.76 | N6 = 1.846660 | ν6 = 23.9 |
| R12 = −2.028 | D12 = 0.12 | N7 = 1.834807 | ν7 = 42.7 |
| R13 = 16.076 | D13 = Variable | | |
| R14 = Stop | D14 = 0.32 | | |
| R15 = 5.170 | D15 = 0.79 | N8 = 1.696797 | ν8 = 55.5 |
| R16 = −5.998 | D16 = 0.05 | | |
| R17 = 25.369 | D17 = 0.17 | N9 = 1.846659 | ν9 = 23.8 |
| R18 = 2.546 | D18 = 1.10 | N10 = 1.696797 | ν10 = 55.5 |
| R19 = −4.534 | D19 = Variable | | |
| R20 = −4.579 | D20 = 0.15 | N11 = 1.603112 | ν11 = 60.6 |
| R21 = 1.525 | D21 = 0.49 | N12 = 1.846660 | ν12 = 23.9 |
| R22 = 2.939 | D22 = Variable | | |
| R23 = 2.320 | D23 = 0.15 | N13 = 1.846660 | ν13 = 23.9 |
| R24 = 1.184 | D24 = 1.23 | N14 = 1.583126 | ν14 = 59.4 |
| R25 = −2.180 | D25 = 0.24 | | |
| R26 = ∞ | D26 = 0.90 | N15 = 1.516330 | ν15 = 64.2 |
| R27 = ∞ | | | |

| | Focal Length | | |
|---|---|---|---|
| Variable Interval | 1.00 | 9.82 | 19.50 |
| D6 | 0.14 | 5.23 | 6.20 |
| D13 | 5.97 | 0.81 | 0.26 |
| D19 | 0.75 | 2.60 | 0.26 |
| D22 | 2.52 | 0.73 | 2.66 |

| Aspherical Coefficients | | | |
|---|---|---|---|
| R15 k = 5.78318e−01 | B = −8.11169e−03 | C = −1.61157e−04 | D = 1.86577e−05 |
| E = 9.49501e−05 | F = −3.05828e−05 | | |
| R25 k = −4.81606e+00 | B = −4.11528e−02 | C = 1.01847e−01 | D = −5.18640e−02 |
| E = −1.17372e−01 | F = 1.00029e−01 | | |

NUMERICAL EXAMPLE 4

| f = 1 to 19.75 Fno = 1.65 to 3.69 2ω = 57.5 to 3.2 | | | |
|---|---|---|---|
| R1 = 8.769 | D1 = 0.29 | N1 = 1.846660 | ν1 = 23.9 |
| R2 = 6.493 | D2 = 0.12 | | |
| R3 = 6.993 | D3 = 1.02 | N2 = 1.433870 | ν2 = 95.1 |
| R4 = −32.095 | D4 = 0.05 | | |
| R5 = 5.526 | D5 = 0.85 | N3 = 1.496999 | ν3 = 81.5 |
| R6 = 18.437 | D6 = Variable | | |
| R7 = 10.618 | D7 = 0.15 | N4 = 1.772499 | ν4 = 49.6 |
| R8 = 1.998 | D8 = 0.68 | | |
| R9 = −2.941 | D9 = 0.15 | N5 = 1.603112 | ν5 = 60.6 |
| R10 = 2.815 | D10 = 0.21 | | |
| R11 = 3.281 | D11 = 0.44 | N6 = 1.922860 | ν6 = 18.9 |
| R12 = 8.599 | D12 = Variable | | |
| R13 = Stop | D13 = 0.32 | | |
| R14 = 4.865 | D14 = 0.70 | N7 = 1.696797 | ν7 = 55.5 |
| R15 = −8.557 | D15 = 0.05 | | |
| R16 = 12.257 | D16 = 0.17 | N8 = 1.846659 | ν8 = 23.8 |
| R17 = 2.317 | D17 = 1.07 | N9 = 1.696797 | ν9 = 55.5 |
| R18 = −3.875 | D18 = Variable | | |
| R19 = −4.740 | D19 = 0.15 | N10 = 1.603112 | ν10 = 60.6 |

-continued

| | | | |
|---|---|---|---|
| R20 = 1.451 | D20 = 0.49 | N11 = 1.846660 | ν11 = 23.9 |
| R21 = 2.504 | D21 = Variable | | |
| R22 = 2.389 | D22 = 0.15 | N12 = 1.846660 | ν12 = 23.9 |
| R23 = 1.200 | D23 = 1.16 | N13 = 1.583126 | ν13 = 59.4 |
| R24 = −2.468 | D24 = 0.24 | | |
| R25 = ∞ | D25 = 0.90 | N14 = 1.516330 | ν14 = 64.2 |
| R26 = ∞ | | | |

| | Focal Length | | |
|---|---|---|---|
| Variable Interval | 1.00 | 14.13 | 19.75 |
| D6 | 0.14 | 5.13 | 6.08 |
| D12 | 7.43 | 0.23 | 0.19 |
| D18 | 0.45 | 1.81 | 0.22 |
| D21 | 1.90 | 2.74 | 3.43 |

| Aspherical Coefficients | | | |
|---|---|---|---|
| R8 k = −2.23929e−03 | B = −6.76013e−04 | C = 3.50842e−04 | D = 1.15932e−04 |
| E = 1.53210e−04 | F = 1.56987e−04 | | |
| R14 k = 2.72962e+00 | B = −1.13848e−02 | C = −1.00212e−03 | D = 2.60387e−04 |
| E = 1.57109e−04 | F = −9.63308e−05 | | |
| R24 k = −2.19862e+00 | B = −1.46808e−02 | C = 5.84113e−02 | D = −1.38768e−02 |
| E = −7.47825e−02 | F = 4.81410e−02 | | |

NUMERICAL EXAMPLE 5

| f = 1 to 19.51 Fno = 1.65 to 3.69 2ω = 57.5 to 3.2 | | | |
|---|---|---|---|
| R1 = 10.396 | D1 = 0.29 | N1 = 1.846660 | ν1 = 23.9 |
| R2 = 6.685 | D2 = 0.12 | | |
| R3 = 8.354 | D3 = 0.80 | N2 = 1.433870 | ν2 = 95.1 |
| R4 = −44.119 | D4 = 0.05 | | |
| R5 = 5.481 | D5 = 0.83 | N3 = 1.603112 | ν3 = 60.6 |
| R6 = 33.961 | D6 = Variable | | |
| R7 = 15.602 | D7 = 0.15 | N4 = 1.882997 | ν4 = 40.8 |
| R8 = 1.494 | D8 = 0.53 | | |
| R9 = −2.164 | D9 = 0.15 | N5 = 1.804000 | ν5 = 46.6 |
| R10 = 7.953 | D10 = 0.21 | | |
| R11 = 6.163 | D11 = 0.49 | N6 = 1.846660 | ν6 = 23.9 |
| R12 = −4.992 | D12 = Variable | | |
| R13 = 6.038 | D13 = 0.72 | N7 = 1.696797 | ν7 = 55.5 |
| R14 = −5.632 | D14 = 0.24 | | |
| R15 = Stop | D15 = 0.49 | | |
| R16 = 27.735 | D16 = 0.17 | N8 = 1.846659 | ν8 = 23.8 |
| R17 = 2.600 | D17 = 0.80 | N9 = 1.696797 | ν9 = 55.5 |
| R18 = −3.992 | D18 = Variable | | |
| R19 = −3.928 | D19 = 0.15 | N10 = 1.603112 | ν10 = 60.6 |
| R20 = 1.292 | D20 = 0.49 | N11 = 1.846660 | ν11 = 23.9 |
| R21 = 2.111 | D21 = Variable | | |
| R22 = 2.383 | D22 = 0.15 | N12 = 1.846660 | ν12 = 23.9 |
| R23 = 1.152 | D23 = 1.19 | N13 = 1.583126 | ν13 = 59.4 |
| R24 = −1.961 | D24 = 0.24 | | |
| R25 = ∞ | D25 = 0.90 | N14 = 1.516330 | ν14 = 64.2 |
| R26 = ∞ | | | |

| | Focal Length | | |
|---|---|---|---|
| Variable Interval | 1.00 | 9.39 | 19.51 |
| D6 | 0.15 | 5.55 | 6.57 |
| D12 | 6.68 | 1.07 | 0.19 |
| D18 | 0.86 | 2.03 | 0.29 |
| D21 | 1.17 | 0.21 | 1.80 |

| Aspherical Coefficients | | | |
|---|---|---|---|
| R13 k = 1.78667e+00 | B = −5.39312e−03 | C = −1.27489e−03 | D = 8.32487e−04 |
| E = 9.08016e−06 | F = −8.06772e−05 | | |
| R14 k = 6.04054e−01 | B = 3.39022e−03 | C = −1.27568e−04 | D = 3.19784e−04 |
| E = 4.98840e−05 | F = −6.39042e−05 | | |

-continued

R24  k = −7.00958e+00   B = −8.51094e−02   C = 4.84721e−02   D = 4.98282e−02
     E = −1.32411e−01   F = 6.47299e−02

TABLE 1

| Conditional expression | Numerical example | | | | |
|---|---|---|---|---|---|
| | 1 | 2 | 3 | 4 | 5 |
| (1) | 0.35 | 0.37 | 0.32 | 0.38 | 0.37 |
| (2) | 2.94 | 3.58 | 3.24 | 3.94 | 2.40 |
| (3) | 0.82 | 0.78 | 0.77 | 0.82 | 1.11 |
| (4) | 3.83 | 1.88 | 3.61 | 1.72 | 4.91 |
| (5) | 1.84 | 1.77 | 1.86 | 1.77 | 1.84 |
| (6) | 0.72 | 0.66 | 0.49 | 0.68 | 0.69 |
| (7) | 0.0091 | 0.0111 | 0.0094 | 0.0114 | 0.0094 |

Next, an example of a video camera using the zoom lens according to the present invention as a photographing optical system will be described with reference to FIG. 21.

In FIG. 21, the video camera includes a video camera main body 10, a photographing optical system 11, a solid-state image pick up element (photoelectric transducer) 12 such as a CCD sensor or a CMOS sensor, a memory 13, and a finder 14. The photographing optical system 11 includes the zoom lens according to the present invention. The solid-state image pick up element 12 receives a subject image formed by the photographing optical system 11. The memory 13 stores information corresponding to the subject image subjected to photoelectric conversion by the solid state image pick up element 12. The finder 14 is used to observe the subject image displayed on a display element (not shown).

The display element includes, for example, a liquid crystal panel, and the subject image formed on the solid-state image pick up element 12 is displayed thereon.

As described above, the zoom lens according to the present invention is applied to an image pick up apparatus such as the video camera. Therefore, the image pick up apparatus which is small in size and has high optical performance is realized.

The zoom lens according to the present invention can be applied to a digital still camera in the same manner.

This application claims priority from Japanese Patent Application No. 2005-162693 filed Jun. 2, 2005, which is hereby incorporated by reference herein.

What is claimed is:

1. A zoom lens, comprising, in order from an object side to an image side:
a first lens unit having positive optical power;
a second lens unit having negative optical power;
a third lens unit having positive optical power, the third lens unit including an aperture stop;
a fourth lens unit having negative optical power; and
a fifth lens unit having positive refractive power, wherein the first lens unit does not move for zooming, and during zooming from a wide-angle end to a telephoto end:
the second lens unit moves toward the image side; and
the third lens unit moves together with the aperture stop, wherein:
the fourth lens unit moves during the zooming; and
the fourth lens unit moves during focusing.

2. An image pick up apparatus, comprising:
a zoom lens according to claim 1; and
a solid-state image pick up element for receiving an image formed by the zoom lens.

3. A zoom lens according to claim 1, wherein the third lens unit moves along a locus convex to the object side during the zooming from the wide-angle end to the telephoto end.

4. A zoom lens according to claim 1, wherein at least one of three conditions $$0.2 < |f2/fA| < 0.4$$

$$2.10 < e4T/fw < 4.35$$

$$0.7 < |f3/f4| < 1.3$$

is satisfied, where $$fA = \sqrt{fw \cdot ft}$$

fw and ft represent a focal length of an entire system at the wide-angle end and a focal length thereof at the telephoto end, respectively, f2 represents a focal length of the second lens unit, f3 represents a focal length of the third lens unit, f4 represents a focal length of the fourth lens unit, and e4T represents a principal point interval between the fourth lens unit and the fifth lens unit in a case where focusing is performed on an infinitely distant object at the telephoto end.

5. A zoom lens according to claim 1, wherein the following condition is satisfied, $$1.5 < M2/M3 < 5.4,$$

where M2 represents a movement amount of the second lens unit in a case where zooming is performed from the wide-angle end to the telephoto end and M3 represents a distance on an optical axis between a position of the third lens unit in a case where the third lens unit is located at the most object side and a position thereof in the case where the third lens unit is located at the most image side.

6. A zoom lens according to claim 1, wherein the second lens unit comprises an aspherical shape having an optical power that becomes weaker as a position in the second lens unit becomes farther from a lens center and closer to a lens circumference.

7. A zoom lens according to claim 1, wherein the following condition is satisfied, $$1.76 < Nn < 2.01,$$

where Nn represents an average refractive index of lens materials of the second lens unit.

8. A zoom lens according to claim 1, wherein the following condition is satisfied, $$0.46 < |R22/R23| < 0.79,$$

where R2i represents a curvature radius of an i-th lens surface of the second lens unit counted from the object side.

9. A zoom lens according to claim 1, wherein the first lens unit includes at least one negative lens and a plurality of positive lenses, an average Abbe number of materials of the positive lenses is equal to or larger than 68, and an Abbe number of a material of at least one positive lens is equal to or larger than 70.

10. A zoom lens according to claim 1, wherein the aperture stop is located on the object side of the third lens unit or between the lenses of the third lens unit.

11. A zoom lens according to claim 1, wherein at least part of the third lens unit are shifted in a direction perpendicular to an optical axis or rotated about an axis orthogonal to the optical axis.

12. A zoom lens according to claim 11, wherein the following condition is satisfied, $$1.7 \times 10^{-3} < |(1-\beta a) \cdot \beta R| \cdot EM/ft < 0.05,$$

where EM and βa represent a maximum movement amount and a photographing magnification of the at least part of the third lens unit at the telephoto end, respectively, ft represents a focal length of an entire system at the telephoto end, and βR represents a photographing magnification of a lens system located closer to the image side than the at least part of the third lens unit.

13. A zoom lens, comprising, in order from an object side to an image side:
   a first lens unit having positive optical power;
   a second lens unit having negative optical power;
   a third lens unit having positive optical power, the third lens unit including an aperture stop;
   a fourth lens unit having negative optical power; and
   a fifth lens unit having positive refractive power, wherein the first lens unit does not move for zooming, and during zooming from a wide-angle end to a telephoto end:
   the second lens unit moves toward the image side; and
   the third lens unit moves together with the aperture stop,
      wherein at least one of three conditions $$0.2 < |f2/fA| < 0.4$$

$$2.10 < e4T/fw < 4.35$$

$$0.7 < |f3/f4| < 1.3$$

is satisfied, where $$fA = \sqrt{fw \cdot ft}$$

fw and ft represent a focal length of an entire system at the wide-angle end and a focal length thereof at the telephoto end, respectively, f2 represents a focal length of the second lens unit, f3 represents a focal length of the third lens unit, f4 represents a focal length of the fourth lens unit, and e4T represents a principal point interval between the fourth lens unit and the fifth lens unit in a case where focusing is performed on an infinitely distant object at the telephoto end.

14. An image pick up apparatus, comprising:
   a zoom lens according to claim 13; and
   a solid-state image pick up element for receiving an image formed by the zoom lens.

15. A zoom lens, comprising, in order from an object side to an image side:
   a first lens unit having positive optical power;
   a second lens unit having negative optical power;
   a third lens unit having positive optical power, the third lens unit including an aperture stop;
   a fourth lens unit having negative optical power; and
   a fifth lens unit having positive refractive power,
   wherein the first lens unit does not move for zooming, and during zooming from a wide-angle end to a telephoto end:
   the second lens unit moves toward the image side; and
   the third lens unit moves together with the aperture stop,
      wherein the following condition is satisfied, $$1.5 < M2/M3 < 5.4,$$

where M2 represents a movement amount of the second lens unit in a case where zooming is performed from the wide-angle end to the telephoto end and M3 represents a distance on an optical axis between a position of the third lens unit in a case where the third lens unit is located at the most object side and a position thereof in the case where the third lens unit is located at the most image side.

16. An image pick up apparatus, comprising:
   a zoom lens according to claim 15; and
   a solid-state image pick up element for receiving an image formed by the zoom lens.

17. A zoom lens, comprising, in order from an object side to an image side:
   a first lens unit having positive optical power;
   a second lens unit having negative optical power;
   a third lens unit having positive optical power, the third lens unit including an aperture stop;
   a fourth lens unit having negative optical power; and
   a fifth lens unit having positive refractive power,
   wherein the first lens unit does not move for zooming, and during zooming from a wide-angle end to a telephoto end:
   the second lens unit moves toward the image side; and
   the third lens unit moves together with the aperture stop,
      wherein the second lens unit comprises an aspherical shape having an optical power that becomes weaker as a position in the second lens unit becomes farther from a lens center and closer to a lens circumference.

18. An image pick up apparatus, comprising:
   a zoom lens according to claim 17; and
   a solid-state image pick up element for receiving an image formed by the zoom lens.

19. A zoom lens, comprising, in order from an object side to an image side:
   a first lens unit having positive optical power;
   a second lens unit having negative optical power;
   a third lens unit having positive optical power, the third lens unit including an aperture stop;
   a fourth lens unit having negative optical power; and
   a fifth lens unit having positive refractive power,
   wherein the first lens unit does not move for zooming, and during zooming from a wide-angle end to a telephoto end:
   the second lens unit moves toward the image side; and
   the third lens unit moves together with the aperture stop,
      wherein the following condition is satisfied, $$1.76 < Nn < 2.01,$$

where Nn represents an average refractive index of lens materials of the second lens unit.

20. An image pick up apparatus, comprising:
   a zoom lens according to claim 19; and
   a solid-state image pick up element for receiving an image formed by the zoom lens.

21. A zoom lens, comprising, in order from an object side to an image side:
   a first lens unit having positive optical power;
   a second lens unit having negative optical power;
   a third lens unit having positive optical power, the third lens unit including an aperture stop;
   a fourth lens unit having negative optical power; and
   a fifth lens unit having positive refractive power,
   wherein the first lens unit does not move for zooming, and during zooming from a wide-angle end to a telephoto end:
   the second lens unit moves toward the image side; and
   the third lens unit moves together with the aperture stop, wherein the following condition is satisfied, $$0.46 < |R22/R23| < 0.79,$$

where R2i represents a curvature radius of an i-th lens surface of the second lens unit counted from the object side.

22. An image pick up apparatus, comprising:
a zoom lens according to claim 21; and
a solid-state image pick up element for receiving an image formed by the zoom lens.

23. A zoom lens, comprising, in order from an object side to an image side:
a first lens unit having positive optical power;
a second lens unit having negative optical power;
a third lens unit having positive optical power, the third lens unit including an aperture stop;
a fourth lens unit having negative optical power; and
a fifth lens unit having positive refractive power,
wherein the first lens unit does not move for zooming, and during zooming from a wide-angle end to a telephoto end:
the second lens unit moves toward the image side; and
the third lens unit moves together with the aperture stop,
wherein the first lens unit includes at least one negative lens and a plurality of positive lenses, an average Abbe number of materials of the positive lenses is equal to or larger than 68, and an Abbe number of a material of at least one positive lens is equal to or larger than 70.

24. An image pick up apparatus, comprising:
a zoom lens according to claim 23; and
a solid-state image pick up element for receiving an image formed by the zoom lens.

25. A zoom lens, comprising, in order from an object side to an image side:
a first lens unit having positive optical power;
a second lens unit having negative optical power;
a third lens unit having positive optical power, the third lens unit including an aperture stop;
a fourth lens unit having negative optical power; and
a fifth lens unit having positive refractive power,
wherein the first lens unit does not move for zooming, and during zooming from a wide-angle end to a telephoto end:
the second lens unit moves toward the image side; and
the third lens unit moves together with the aperture stop,
wherein at least part of the third lens unit are shifted in a direction perpendicular to an optical axis or rotated about an axis orthogonal to the optical axis.

26. An image pick up apparatus, comprising:
a zoom lens according to claim 25; and
a solid-state image pick up element for receiving an image formed by the zoom lens.

* * * * *